United States Patent
Kao et al.

(10) Patent No.: US 9,234,060 B2
(45) Date of Patent: Jan. 12, 2016

(54) METHODS OF PREPARING A CATALYST SYSTEM

(71) Applicant: Univation Technologies, LLC, Houston, TX (US)

(72) Inventors: Sun-Chueh Kao, Pearland, TX (US); Phuong A. Cao, Old Bridge, NJ (US); C. Jeff Harlan, Houston, TX (US); Parul A. Khokhani, Manalapan, NJ (US); George Rodriguez, Houston, TX (US); Francis C. Rix, Houston, TX (US); Garth R. Giesbrecht, The Woodlands, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/356,419

(22) PCT Filed: Nov. 6, 2012

(86) PCT No.: PCT/US2012/063703
§ 371 (c)(1),
(2) Date: May 6, 2014

(87) PCT Pub. No.: WO2013/070601
PCT Pub. Date: May 16, 2013

(65) Prior Publication Data
US 2015/0166699 A1    Jun. 18, 2015

Related U.S. Application Data

(60) Provisional application No. 61/556,925, filed on Nov. 8, 2011.

(51) Int. Cl.
| | | |
|---|---|---|
| C08F 4/642 | (2006.01) | |
| C08F 4/6592 | (2006.01) | |
| C08F 210/16 | (2006.01) | |
| C08F 4/659 | (2006.01) | |
| C08F 4/64 | (2006.01) | |
| B01J 31/14 | (2006.01) | |

(52) U.S. Cl.
CPC ............... *C08F 210/16* (2013.01); *B01J 31/14* (2013.01); *B01J 31/143* (2013.01); *C08F 4/642* (2013.01); *C08F 4/64079* (2013.01); *C08F 4/6592* (2013.01); *C08F 4/65912* (2013.01); *C08F 4/65916* (2013.01); *C08F 4/64141* (2013.01); *C08F 4/64148* (2013.01); *C08F 4/64189* (2013.01); *C08F 4/64193* (2013.01); *C08F 4/65925* (2013.01); *C08F 4/65927* (2013.01)

(58) Field of Classification Search
CPC ............ C08F 4/02; C08F 4/025; C08F 4/642; C08F 4/65912; C08F 4/6592; C08F 4/65925; C08F 4/64079; C08F 4/64141; C08F 4/64148; C08F 4/64189; C08F 4/64193; C08F 4/65927; C08F 4/65916
See application file for complete search history.

(56) References Cited

U.S. PATENT DOCUMENTS

| | | | |
|---|---|---|---|
| 3,709,853 | A | 1/1973 | Karapinka |
| 4,003,712 | A | 1/1977 | Miller |
| 4,011,382 | A | 3/1977 | Levine et al. |
| 4,077,904 | A | 3/1978 | Noshay et al. |
| 4,115,639 | A | 9/1978 | Brown et al. |
| 4,302,565 | A | 11/1981 | Goeke et al. |
| 4,302,566 | A | 11/1981 | Karol et al. |
| 4,482,687 | A | 11/1984 | Noshay et al. |
| 4,543,399 | A | 9/1985 | Jenkins, III et al. |
| 4,555,370 | A | 11/1985 | Klauke et al. |
| 4,564,605 | A | 1/1986 | Collomb et al. |
| 4,638,029 | A | 1/1987 | Meschke et al. |
| 4,665,208 | A | 5/1987 | Welborn, Jr. et al. |
| 4,721,763 | A | 1/1988 | Bailly et al. |
| 4,728,705 | A | 3/1988 | Nestlerode et al. |
| 4,803,251 | A | 2/1989 | Goode et al. |
| 4,874,734 | A | 10/1989 | Kioka et al. |
| 4,879,359 | A | 11/1989 | Chamla et al. |
| 4,882,400 | A | 11/1989 | Dumain et al. |
| 4,908,463 | A | 3/1990 | Bottelberghe |
| 4,924,018 | A | 5/1990 | Bottelberghe |
| 4,952,540 | A | 8/1990 | Kioka et al. |
| 4,960,741 | A | 10/1990 | Bailly et al. |
| 4,968,827 | A | 11/1990 | Davis |
| 5,026,798 | A | 6/1991 | Canich |
| 5,041,584 | A | 8/1991 | Crapo et al. |
| RE33,683 | E | 9/1991 | Allen et al. |
| 5,091,352 | A | 2/1992 | Kioka et al. |

(Continued)

FOREIGN PATENT DOCUMENTS

| | | |
|---|---|---|
| BE | 839380 | 3/1977 |
| EP | 089005 | 9/1983 |

(Continued)

OTHER PUBLICATIONS

Chum, T. et al.; "Structure, Properties and Preparation of Polyolefins Produced by Single-site Catalyst Technology," 1 Metallocene-Based Polyolefins (John Scheirs & W. Kaminsky ed.) pp. 261-377 (2000).

(Continued)

*Primary Examiner* — Caixia Lu

(74) *Attorney, Agent, or Firm* — Brooks, Cameron & Huebsch, PLLC

(57) ABSTRACT

Disclosed herein are methods of preparing a catalyst system comprising a spray-dried activator and polymerization processes employing these catalyst systems.

13 Claims, No Drawings

(56) References Cited

U.S. PATENT DOCUMENTS

| | | | |
|---|---|---|---|
| 5,093,415 A | 3/1992 | Brady, III et al. |
| 5,103,031 A | 4/1992 | Smith, Jr. |
| 5,157,137 A | 10/1992 | Sangakoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,278,119 A | 1/1994 | Turner et al. |
| 5,283,278 A | 2/1994 | Daire et al. |
| 5,288,933 A | 2/1994 | Kao et al. |
| 5,290,745 A | 3/1994 | Jorgensen et al. |
| 5,306,350 A | 4/1994 | Hoy et al. |
| 5,308,815 A | 5/1994 | Sangokoya |
| 5,318,935 A | 6/1994 | Canich et al. |
| 5,329,032 A | 7/1994 | Tran et al. |
| 5,352,749 A | 10/1994 | DeChellis et al. |
| 5,391,529 A | 2/1995 | Sangokoya |
| 5,391,793 A | 2/1995 | Marks et al. |
| 5,518,973 A | 5/1996 | Miro et al. |
| 5,525,678 A | 6/1996 | Mink et al. |
| 5,541,270 A | 7/1996 | Chinh et al. |
| 5,604,172 A | 2/1997 | Wagner et al. |
| 5,693,838 A | 12/1997 | Sangokoya et al. |
| 5,703,187 A | 12/1997 | Timmers |
| 5,716,558 A | 2/1998 | Nielsen et al. |
| 5,731,253 A | 3/1998 | Sangokoya |
| 5,731,451 A | 3/1998 | Smith et al. |
| 5,744,656 A | 4/1998 | Askham |
| 5,747,406 A | 5/1998 | Reichle et al. |
| 5,847,177 A | 12/1998 | Sankokoya et al. |
| 5,854,166 A | 12/1998 | Marks et al. |
| 5,856,256 A | 1/1999 | Marks et al. |
| 5,889,128 A | 3/1999 | Schrock et al. |
| 5,939,346 A | 8/1999 | Marks et al. |
| 5,942,459 A | 8/1999 | Sugano et al. |
| 5,962,606 A | 10/1999 | Williams et al. |
| 6,069,213 A | 5/2000 | Nemzek et al. |
| 6,075,101 A | 6/2000 | Lynn et al. |
| 6,265,338 B1 | 7/2001 | Canich |
| 6,271,325 B1 | 8/2001 | McConville et al. |
| 6,309,997 B1 | 10/2001 | Fujita et al. |
| 6,333,389 B2 | 12/2001 | Whiteker et al. |
| 6,562,905 B1 | 5/2003 | Nummila et al. |
| 6,689,847 B2 | 2/2004 | Mawson et al. |
| 6,841,502 B2 | 1/2005 | Boussie et al. |
| 6,884,748 B2 | 4/2005 | McCullough |
| 6,958,306 B2 | 10/2005 | Holtcamp |
| 6,982,236 B2 | 1/2006 | Wenzel et al. |
| 6,995,109 B2 | 2/2006 | Mink et al. |
| 7,030,256 B2 | 4/2006 | Boussie et al. |
| 7,060,848 B2 | 6/2006 | Boussie et al. |
| 7,091,282 B2 | 8/2006 | Chen et al. |
| 7,126,031 B2 | 10/2006 | Boussie et al. |
| 7,129,302 B2 | 10/2006 | Mink et al. |
| 7,157,531 B2 | 1/2007 | Szul et al. |
| 7,169,864 B2 | 1/2007 | Paczkowski et al. |
| 7,179,876 B2 | 2/2007 | Szul et al. |
| 7,220,804 B1 | 5/2007 | Kao |
| 7,384,884 B2 | 6/2008 | Wenzel et al. |
| 2003/0224929 A1 | 12/2003 | Cook |
| 2006/0019925 A1 | 1/2006 | Kiribayashi et al. |
| 2006/0020588 A1 | 1/2006 | Liu et al. |
| 2006/0025548 A1 | 2/2006 | Boussie et al. |
| 2006/0211892 A1 | 9/2006 | Boussie et al. |
| 2006/0293470 A1 | 12/2006 | Cao et al. |
| 2007/0055028 A1 | 3/2007 | Casty et al. |
| 2007/0191215 A1 | 8/2007 | Muruganandam et al. |
| 2010/0041841 A1 | 2/2010 | Terry et al. |
| 2011/0305312 A1 | 12/2011 | Hu |

FOREIGN PATENT DOCUMENTS

| | | |
|---|---|---|
| EP | 0102503 | 3/1984 |
| EP | 0103120 | 3/1984 |
| EP | 0229368 | 7/1987 |
| EP | 0231102 | 8/1987 |
| EP | 0279586 | 8/1988 |
| EP | 0561476 | 9/1993 |
| EP | 0586665 | 3/1994 |
| EP | 0594218 | 4/1994 |
| EP | 0668295 A1 | 8/1995 |
| EP | 0703246 | 3/1996 |
| EP | 0763546 A1 | 3/1997 |
| EP | 0802202 | 10/1997 |
| EP | 0893454 | 1/1999 |
| EP | 1231225 | 8/2002 |
| EP | 0961784 B1 | 10/2002 |
| WO | WO 94/10180 | 5/1994 |
| WO | WO 97/22635 | 6/1997 |
| WO | WO 98/37101 | 8/1998 |
| WO | WO 98/43983 | 10/1998 |
| WO | WO 98/46651 | 10/1998 |
| WO | WO 99/01460 | 1/1999 |
| WO | WO 99/15534 | 4/1999 |
| WO | WO 99/64476 | 12/1999 |
| WO | WO 00/04058 | 1/2000 |
| WO | WO 00/04059 | 1/2000 |
| WO | WO 00/29454 | 5/2000 |
| WO | WO 00/37513 | 6/2000 |
| WO | WO 01/30860 | 5/2001 |
| WO | WO 01/30861 | 5/2001 |
| WO | WO 01/42249 | 6/2001 |
| WO | WO 01/44322 | 6/2001 |
| WO | WO 01/81435 | 11/2001 |
| WO | WO 02/00666 | 1/2002 |
| WO | WO 02/00738 | 1/2002 |
| WO | WO 02/18452 | 3/2002 |
| WO | WO 02/36639 | 5/2002 |
| WO | WO 02/46246 | 6/2002 |
| WO | WO 02/50088 | 6/2002 |
| WO | WO 02/051884 | 7/2002 |
| WO | WO 02/102857 | 12/2002 |
| WO | WO 03/000740 | 1/2003 |
| WO | WO 03/040070 | 5/2003 |
| WO | WO 03/049856 | 6/2003 |
| WO | WO 03/051892 | 6/2003 |
| WO | WO 03/091262 | 11/2003 |
| WO | WO 2004/026921 | 4/2004 |
| WO | WO 2005/108406 | 11/2005 |
| WO | WO 2006/019494 | 2/2006 |
| WO | WO 2006/020624 | 2/2006 |
| WO | WO 2008/042078 A1 | 4/2008 |
| WO | WO 2008/042177 A1 | 4/2008 |
| WO | WO 2008/042182 A1 | 4/2008 |
| WO | WO 2009/023111 | 2/2009 |

OTHER PUBLICATIONS

Gibson V. et al.; "Advances in Non-Metallocene Olefin Polymerization Catalysis," Chem Rev 2003, 103, 283-315.

Hlatky, G.G. in 181 Coordination Chem. Rev. 243-296 (1999).

Hungenberg K. D., et al., "Gas Phase Polymerization of Alpha Olefins," Ziegler Catalysts 363-386 (G. Fink, R. Mulhaupt and H. H. Brintzinger, eds., Springer-Verlag 1995).

Matsui S., et al.; "A Family of Zirconium Complexes Having Two Phenoxy—Imine Chelate Ligands for Olefin Polymerization," J Am Chem Soc 2001, 123, 6847-6856.

Nakayama, Y. et al., "MgCl2RnAlOR3-n: An Excellent Activator Support for Transition-Metal Complexes for Olefin Polymerization," Chem. Eur. J. 2006, 12, 7546-7556.

Nakayama Y., et al.,"Olefin polymerization behavior of bis etc." J Mol Catal A 2004, 213, 141-150.

Nakayama Y., et al., "Propylene Polymerization Behavior of Fluorinated Bis etc." Macromol Chem Phys, 2005, 206, pp. 1847-1852.

Resconi, L., et al.; "Selectivity in Propene Polymerization with Metallocene Catalysts," Chem. Rev. 2000, 100, 1253-1345.

METHODS OF PREPARING A CATALYST SYSTEM

CROSS-REFERENCE TO RELATED APPLICATIONS

This application is a National Stage application under 35 U.S.C. §371 of International Application No. PCT/US2012/63703, filed Nov. 6, 2012, that claims the benefit of Ser. No. 61/556,925, filed Nov. 8, 2011, the disclosures of which are incorporated by reference in their entireties.

BACKGROUND

Advances in polymerization and catalysts have produced new polymers having improved physical and mechanical properties useful in a wide variety of products and applications. Metallocene catalyst systems have been widely used to produce polyolefins and have provided a variety of new and improved polymers. Catalyst systems have also been used that comprise more than one catalyst component, which in effect provide more than one active site to polymerize monomers during the polymerization process, and can be used to produce multimodal polymers. However, there is continued focus in the industry on developing new and improved catalyst systems. For example, there has been a focus on improving the operability of catalyst systems, and improving catalyst productivity, as well as on designing new catalyst systems. Different catalyst manufacturing and catalyst preparation techniques have been used to try to improve the operability and productivity of catalyst systems.

One conventional technique for the preparation of supported catalyst systems is to slurry a solvent mixture of a catalyst component and activator with the support followed by heating to remove the solvent. Drawbacks to this technique can include product stability uncertainty as the time and temperature profile of the drying step may affect performance and productivity of the catalyst system. This uncertainty can escalate with metallocene catalyst components or other single-site components activated by aluminoxanes since some of these systems may be thermally unstable. In addition, extra care may be needed in handling these materials as the resulting catalyst systems may be air/moisture sensitive and/or pyrophoric.

Another method for preparing a supported catalyst system can involve contacting a supported activator with a catalyst component. While this method can result in a catalyst system with improved handling characteristics, the catalyst productivity may be less than optimal.

Thus, there is a continued need for improved methods for preparing and manufacturing catalyst systems. In particular there is a need for methods of preparing catalyst systems that result in improved catalyst systems having improved productivity and operability.

SUMMARY

Disclosed herein are methods of preparing a catalyst system using a spray-dried activator, catalyst systems comprising the spray-dried activator, and polymerization processes employing the catalyst systems. For example, the method of preparing a catalyst system may comprise combining a spray-dried activator and a catalyst component to produce the catalyst system. A method of preparing a catalyst system may also comprise combining a spray-dried activator comprising one or more catalyst components with one or more additional catalyst components to produce the catalyst system.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

As used herein, all references to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

It has been discovered that high catalyst productivity can be obtained when a catalyst system comprising a catalyst component supported on a spray-dried activator is used in a polymerization process. This is significant in that supporting the catalyst component on the spray-dried activator can provide for a more economic catalyst system as it allows for preparation of a polymer with increased catalyst productivity using the catalyst systems described herein. The term "catalyst system," as used herein, may include any number of catalysts in any combination as described herein, as well as any activator and support in any combination described herein.

Described herein are catalyst systems comprising spray-dried activators. Also described herein are methods of preparing a catalyst system comprising the spray-dried activator. For example, the catalyst system may be prepared by combining a spray-dried activator and a catalyst component to produce the catalyst system. For example, the catalyst system may be prepared by combining an activator, a filler material, and a diluent to produce a suspension; spray drying the suspension to produce the spray-dried activator; and then combining the spray-dried activator with a catalyst component to produce a catalyst system. In another example, the catalyst system may be prepared by combining an activator, filler material, diluent, and one or more catalyst components to produce a suspension, spray drying the suspension to produce the spray-dried activator comprising one or more catalyst components, and then combining the spray-dried activator comprising one or more catalyst components with one or more additional catalyst components to produce a catalyst system. The one or more catalyst components in the spray-dried activator may be the same or different from the one or more additional catalyst components.

Also described herein are polymerization processes using the catalyst systems described herein that comprise the spray-dried activator or spray-dried activator comprising one or more catalyst components. The polymerization process may comprise preparing a spray-dried activator, introducing the spray-dried activator to the reactor, and separately introducing one or more catalyst components to the polymerization reactor. The polymerization process may also comprise preparing a spray-dried activator comprising one or more catalyst components, introducing the spray-dried activator comprising one or more catalyst components to the reactor, and separately introducing one or more additional catalyst components to the reactor. The one or more additional catalyst components can act as a "trim" and interact with the spray-dried activator or spray-dried activator comprising one or more catalyst components in the reactor to form the catalyst system. Alternatively, the one or more additional catalyst components may be combined with the spray-dried activator comprising one or more catalyst components outside the reactor, and then the mixture may be introduced into the reactor. In some embodiments, the polymerization process may comprise preparing a spray-dried activator, combining the spray-dried activator with one or more catalyst components to produce a catalyst system, and introducing the catalyst system to the polymerization reactor. In such embodiments, the catalyst system may be slurried in a diluent, where the diluents may comprise a mixture of mineral oil and an aliphatic hydrocarbon, which is then introduced to the polymerization reactor.

Catalyst Components

The catalyst systems described herein may comprise one or more catalyst components. Non-limiting examples of catalyst components that may be used include metallocene catalysts, transition metal-containing catalysts, Group 15-containing catalysts, catalysts comprising an oxadiazole compound, biphenyl phenol ("BPP") catalysts, mixed catalysts, and/or combinations thereof. The catalyst system may also include AlCl$_3$, cobalt, iron, palladium, chromium/chromium-oxide, "Phillips" catalysts, or combinations thereof. Any catalyst component or combination of catalysts components can be used alone or in combination with others. In a preferred embodiment, the catalyst system includes a metallocene catalyst component. The term "catalyst component," as used herein, is used interchangeably with the term "catalyst," and includes any compound or component, or combination of compounds and components, that is capable of increasing the rate of a chemical reaction, such as the polymerization or oligomerization of one or more olefins.

The catalyst system may include a catalyst component and a spray dried activator, both as described below. The amount of catalyst compound in the catalyst system can range from a low of about 0.01 mmol, about 0.02 mmol, or about 0.03 mmol to a high of about 0.06 mmol, about 0.07 mmol, about 0.08 mmol, or about 1 mmol, based on the amount of metal in the catalyst compound per gram of catalyst system. For example, if the catalyst system includes a metallocene compound containing a Hf metal atom, the amount of metallocene compound can be based on the amount of Hf (mmol) per gram of the catalyst system.

Metallocene Catalysts

The catalyst system may comprise a metallocene catalyst component. Metallocene catalysts are generally described in, 1 & 2 METALLOCENE-BASED POLYOLEFINS (John. Scheirs & W. Kaminsky eds., John Wiley & Sons, Ltd. 2000); G. G. Hlatky in 181 COORDINATION CHEM. REV. 243-296 (1999) and for use in the synthesis of polyethylene in I METALLOCENE-BASED POLYOLEFINS 261-377 (2000). Metallocene catalysts can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom.

The Cp ligands are one or more rings or ring system(s), at least a portion of which includes π-bonded systems, such as cycloalkadienyl ligands and heterocyclic analogues. The ring(s) or ring system(s) typically comprise atoms selected from Groups 13 to 16 atoms, and, in some embodiments, the atoms that make up the Cp ligands are selected from carbon, nitrogen, oxygen, silicon, sulfur, phosphorous, germanium, boron, aluminum, and combinations thereof, where carbon makes up at least 50% of the ring members. In some embodiments, the Cp ligand(s) are selected from substituted and unsubstituted cyclopentadienyl ligands and ligands isolobal to cyclopentadienyl. Non-limiting examples of such ligands include cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$_{H4}$ Ind"), substituted versions thereof (as discussed and described in more detail below), and heterocyclic versions thereof.

The metal atom "M" of the metallocene compound may be selected from Groups 3 through 12 atoms and lanthanide Group atoms; or may be selected from Groups 3 through 10 atoms; or may be selected from Sc, Ti, Zr, Hf, V, Nb, Ta, Mn, Re, Fe, Ru, Os, Co, Rh, Ir, and Ni; or may be selected from Groups 4, 5, and 6 atoms; or may be Ti, Zr, or Hf atoms; or may be Hf; or may be Zr. The oxidation state of the metal atom "M" can range from 0 to +7; or may be +1, +2, +3, +4 or +5; or may be +2, +3 or +4. The groups bound to the metal atom "M" are such that the compounds described below in the structures and structures are electrically neutral, unless otherwise indicated. The Cp ligand(s) forms at least one chemical bond with the metal atom M to form the "metallocene catalyst component." The Cp ligands are distinct from the leaving groups bound to metal atom M in that they are not highly susceptible to substitution/abstraction reactions.

The metallocene catalyst component may include compounds represented by Structure (I):

$$Cp^A Cp^B MX_n \qquad (I)$$

where M is as described above; each X is chemically bonded to M; each Cp group is chemically bonded to M; and n is 0 or an integer from 1 to 4. In some embodiments, n is either 1 or 2.

The ligands represented by $Cp^A$ and $Cp^B$ in Structure (I) may be the same or different cyclopentadienyl ligands or ligands isolobal to cyclopentadienyl, either or both of which may contain heteroatoms and either or both of which may be substituted by a group R. For example, $Cp^A$ and $Cp^B$ may be independently selected from cyclopentadienyl, indenyl, tetrahydroindenyl, fluorenyl, and substituted derivatives of each.

Independently, each $Cp^A$ and $Cp^B$ of Structure (I) may be unsubstituted or substituted with any one or combination of substituent groups R. Non-limiting examples of substituent groups R as used in Structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyl thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof.

More particular non-limiting examples of alkyl substituents R associated with Structure (I) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins, such as, but not limited to, olefinically unsaturated substituents including vinyl-terminated ligands, for example 3-butenyl, 2-propenyl, 5-hexenyl, and the like. In some embodiments, at least two R groups, for example, two adjacent R groups, are joined to form a ring structure having from 3 to 30 atoms selected from carbon, nitrogen, oxygen, phosphorous, silicon, germanium, aluminum, boron and combinations thereof. Also, a substituent R group, such as 1-butanyl, may form a bonding association to the element M.

Each X in Structure (I), above, and Structures (II)-(Va-d), below, is independently selected from: for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In some embodiments, X is a $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, or $C_1$ to $C_{12}$ heteroatom-containing hydrocarbons, and substituted derivatives thereof. X may be selected from hydride, halogen ions, $C_1$ to $C_6$ alkyls, $C_2$ to $C_6$ alkenyls, $C_7$ to $C_{12}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, or $C_7$ to $C_{18}$ fluoroalkylaryls; or X may be selected from hydride, chloride, fluoride, methyl, phenyl, phenoxy, benzoxy, tosyl, fluoromethyls, and fluorophenyls; or X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls; or X may be selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or X may be selected from fluoride, methyl, ethyl, propyl, phenyl, methylphenyl, dimethylphenyl, trimethylphenyl, fluoromethyls (mono-, di- and trifluoromethyls), and fluorophenyls (mono-, di-, tri-, tetra- and pentafluorophenyls). In some embodiments, at least one X is a halogenated aryloxy group or a derivative thereof. For example, at least one X may be a pentafluorophenoxy group.

The metallocene catalyst component may include those metallocenes of Structure (I) where $Cp^A$ and $Cp^B$ are bridged to each other by at least one bridging group, (A), such that the structure is represented by Structure (II):

$$Cp^A(A)Cp^B MX_n \qquad (II)$$

These bridged compounds represented by Structure (II) are known as "bridged metallocenes." $Cp^A$, $Cp^B$, M, X and n in Structure (II) are as defined above for Structure (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, and divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for Structure (I) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $—Si(R')_2Si(R'_2)—$, $R'_2Ge=$, $R'P=$ (wherein "=" represents two chemical bonds), where R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of Structure (II) has two or more bridging groups (A).

Other non-limiting examples of bridging group (A), in Structure (II), include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In some embodiments, bridging group (A), in Structure (II), may also be cyclic, comprising, 4 to 10 ring members or 5 to 7 ring members. The ring members may be selected from the elements mentioned above, or from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination thereof.

The cyclic bridging groups (A) may be saturated or unsaturated and/or carry one or more substituents and/or be fused to one or more other ring structures. If present, the one or more substituents may be a hydrocarbyl (e.g., alkyl such as methyl) or halogen (e.g., F, Cl). The one or more Cp groups which the above cyclic bridging moieties may optionally be fused to may be saturated or unsaturated and are selected from those having 4 to 10, more particularly 5, 6, or 7 ring members (selected from C, N, O and S in a particular embodiment), such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

In some embodiments, the ligands $Cp^A$ and $Cp^B$ of Structures (I) and (II) may be different from each other, or in other embodiments may be the same as each other.

The metallocene catalyst component may include monoligand metallocene compounds, such as, monocyclopentadienyl catalyst components, as described in WO 93/08221.

The metallocene catalyst component may be an unbridged "half sandwich" metallocene represented by Structure (III):

$$Cp^A MQ_q X_n \qquad (III)$$

where $Cp^A$ is defined as for the Cp groups in Structure (I) and is a ligand that is bonded to M; each Q is independently bonded to M; Q is also bound to $Cp^A$ in one embodiment; X is a leaving group as described above in Structure (I); n ranges from 0 to 3, or is 1 or 2; q ranges from 0 to 3, or is 1 or 2.

$Cp^A$ may be selected from cyclopentadienyl, indenyl, tetrahydroindenyl, fluorenyl, substituted version thereof, and combinations thereof. In Structure (III), Q may be selected from ROO⁻, RO—, R(O)—, —NR—, —CR₂—, —S—, —NR₂, —CR₃, —SR, —SiR₃, —PR₂, —H, and substituted and unsubstituted aryl groups, wherein R is selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. R may be selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in Structure (IV), such as described in, for example, U.S. Pat. No. 6,069,213:

$$Cp^A M(Q_2 GZ)X_n \text{ or } T(Cp^A M(Q_2 GZ)X_n)_m \qquad (IV)$$

where M, $Cp^A$, X and n are as defined above; and $Q_2 GZ$ forms a polydentate ligand unit (e.g., pivalate), where at least one of the Q groups form a bond with M, and is defined such that each Q is independently selected from —O—, —NR—, —CR₂— and —S—; G is either carbon or silicon; and Z is selected from R, —OR, —NR₂, —CR₃, —SR, —SiR₃, —PR₂, and hydride, providing that when Q is —NR—, then Z is selected from —OR, —NR₂, —SR, —SiR₃, —PR₂; and provided that neutral valency for Q is satisfied by Z; and where each R is independently selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof, or each R may be selected from $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys; where T is a bridging group selected from $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; where each T group bridges adjacent "$Cp^A M(Q_2 GZ)X_n$" groups, and is chemically bonded to the $Cp^A$ groups; and where m is an integer from 1 to 7 or m is an integer from 2 to 6.

The metallocene catalyst component could also be described by Structures (Va-i), (Va-ii), (Vb), (Vc), (Vd), (V), and (Vf):

(Va-i)

(Va-ii)

-continued (Vb)
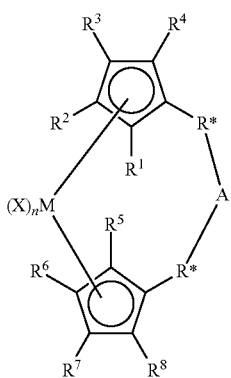

(Vc)
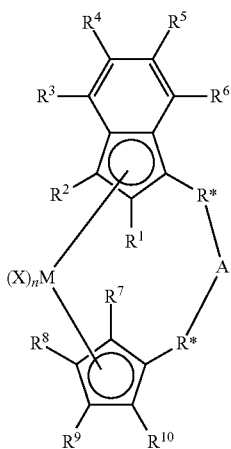

(Vd)
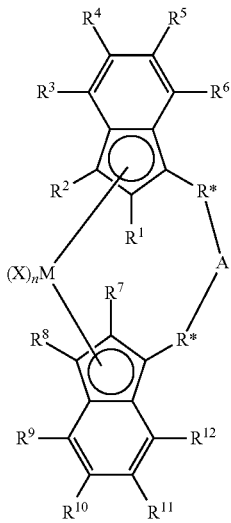

(Ve)
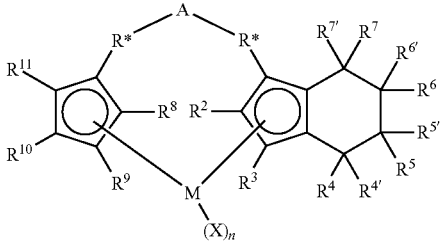

(Vf)
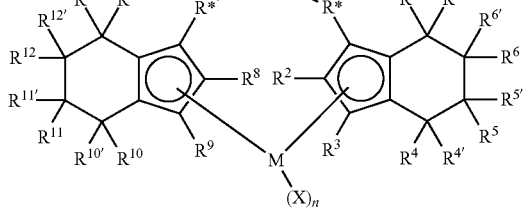

In Structures (Va-i) to (Vf), M may be selected from Group 3 to Group 12 atoms; or may be selected from Group 3 to Group 10; or may be selected from Group 3 to Group 6 atoms; or may be selected from Group 4 atoms; or may be selected from Zr or Hf; or may be Zr.

In Structures (Va-i) to (Vf), Q may be selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, alkylenes, aryls, arylenes, alkoxys, aryloxys, amines, arylamines (e.g., pyridyl)alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q may comprise from 1 to 20 carbon atoms; and wherein the aromatic groups may comprise from 5 to 20 carbon atoms.

In Structures (Va-ii) to (Vf), each R* may be independently selected from the divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. In some embodiments, each R* may be independently selected from divalent hydrocarbylenes and heteroatom-containing hydrocarbylenes; or may be selected from alkylenes, substituted alkylenes, and heteroatom-containing hydrocarbylenes; or may be selected from $C_1$ to $C_{12}$ alkylenes, $C_1$ to $C_{12}$ substituted alkylenes, and $C_1$ to $C_{12}$ heteroatom-containing hydrocarbylenes; or may be selected from $C_1$ to $C_4$ alkylenes. In some embodiments of (Vb) to (Vf), both R* groups are the same.

In Structures (Va-i) to (Vf), A is as described above for (A) in Structure (II). In some embodiments, A may be selected from a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons, and substituted and unsubstituted aryl groups; or may be selected from $C_5$ to $C_8$ cyclic hydrocarbons, —CH$_2$CH$_2$—, =CR$_2$, and =SiR$_2$.

In Structures (Va-i) to (Vf), each R may be independently selected from alkyls, cycloalkyls, aryls, alkoxys, fluoroalkyls, and heteroatom-containing hydrocarbons; or may be selected from $C_1$ to $C_6$ alkyls, substituted phenyls, phenyl, and $C_1$ to $C_6$ alkoxys; or may be selected from methoxy, methyl, phenoxy, and phenyl. In some embodiments, A may be absent, in which case each R* is defined as for $R^1$-$R^{13}$; each X is as described above in (I); n is an integer from 0 to 4, and from 1 to 3 in another embodiment, and 1 or 2 in yet another embodiment; and $R^1$ through $R^{13}$ are independently selected from hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, and aroylaminos. $R^1$ through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof; or may be selected from hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, or $C_7$ to $C_{18}$ fluoroalkylaryls; or may be selected from hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups; wherein adjacent R groups may form a ring, either saturated, partially saturated, or completely saturated.

The structure of the metallocene catalyst component represented by Structures (Va-i) and (Va-ii) may take on many forms such as disclosed in, for example, U.S. Pat. Nos. 5,026, 798, 5,703,187, and 5,747,406, including a dimeric or oligomeric structure, such as disclosed in, for example, U.S. Pat. Nos. 5,026,798 and 6,069,213.

In a particular embodiment of the metallocene represented in Structure (Vd), $R^1$ and $R^2$ form a conjugated 6-membered carbon ring system that may or may not be substituted.

It is contemplated that the metallocene catalysts components described above include their structural or optical or enantiomeric isomers (racemic mixture), and may be a pure enantiomer in one embodiment. As used herein, a single, bridged, asymmetrically substituted metallocene catalyst component having a racemic and/or meso isomer does not, itself, constitute at least two different bridged, metallocene catalyst components. The "metallocene catalyst compound", also referred to herein as the metallocene catalyst component" may comprise any combination of any "embodiment" described herein.

Other suitable metallocenes include but are not limited to the metallocenes described in the U.S. patent cited above, as well as those described in U.S. Pat. Nos. 7,179,876, 7,169, 864, 7,157,531, 7,129,302, 6,995,109, 6,958,306, 6,884748, 6,689,847, U.S. Pat. App. Pub. No. 2007/0055028, and published PCT App. Nos. WO 97/22635, WO 00/699/22, WO 01/30860, WO 01/30861, WO 02/46246, WO 02/50088, WO 04/026921, and WO 06/019494. Additional catalysts suitable for use herein include those described in U.S. Pat. Nos. 6,309, 997, 6,265,338, U.S. Pat. App. Pub. No. 2006/019925, and the following articles: Chem Rev 2000, 100, 1253, Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Transition Metal Catalysts

In some embodiments, the catalyst system may comprise a transition metal catalyst component. Conventional-type transition metal catalysts can be represented by the structure: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, and $TiCl_3.(\frac{1}{3}AlCl_3)$.

Other conventional-type transition metal catalysts include those traditional Ziegler-Naha catalysts that are well known in the art. Illustrative Ziegler-Natta catalysts can be as described in Ziegler Catalysts 363-386 (G. Fink, R. Mulhaupt and H. H. Brintzinger, eds., Springer-Verlag 1995); or in European Patent Nos. EP 0103120; EP 0102503; EP 0231102; EP 0703246; and U.S. Pat. Nos. RE 33,683; 4,302, 565; 5,518,973; 5,525,678; 5,288,933; 5,290,745; 5,093,415; and 6,562,905. Examples of such catalysts include those comprising Group 4, 5, or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Examples of other conventional-type transition metal catalysts are described in U.S. Pat. Nos. 4,115,639; 4,077,904; 4,482,687; 4,564,605; 4,721,763; 4,879,359; and 4,960,741. Conventional-type transition metal catalyst compounds based on magnesium/titanium electron-donor complexes are described in U.S. Pat. Nos. 4,302,565 and 4,302,566.

Transition metal catalyst also include chromium catalysts, which can include disubstituted chromates, such as $CrO_2(OR)_2$; where R is triphenylsilane or a tertiary polyalicyclic alkyl. The chromium catalyst system can further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Group 15-Containing Catalysts

The catalyst system may comprise a Group-15-containing catalyst component. "Group 15-containing catalyst components", as referred to herein, include Group 3 to Group 12 metal complexes, wherein the metal is 2 to 6 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 98/46651, WO 99/01460; EP A1 0 893,454; EP A1 0 894 005; U.S. Pat. Nos. 5,318,935; 5,889,128; 6,333,389 B2; and 6,271,325 B1.

In one embodiment, the Group 15-containing catalyst components may include Group 4 imino-phenol complexes, Group 4 bis(amide) complexes, and Group 4 pyridyl-amide complexes that are active towards olefin polymerization to any extent.

The Group 15-containing catalyst component may be more particularly described by the Structure (VI):

$$\alpha_a\beta_b\gamma_g MX_n \qquad (VI)$$

where β and γ are groups that each comprise at least one Group 14 to Group 16 atom; and β (when present) and γ are groups bonded to M through between 2 and 6 Group 14 to Group 16 atoms, at least two atoms being Group 15-containing atoms. More particularly, β and γ are groups selected from Group 14 and Group 15-containing: alkyls, aryls, alkylaryls, and heterocyclic hydrocarbons, and chemically bonded combinations thereof; or are selected from Group 14 and Group 15-containing: $C_1$ to $C_{10}$ alkyls, $C_6$ to $C_{12}$ aryls, $C_6$ to $C_{18}$ alkylaryls, and $C_4$ to $C_{12}$ heterocyclic hydrocarbons, and chemically bonded combinations thereof; or are selected from $C_1$ to $C_{10}$ alkylamines, $C_1$ to $C_{10}$ alkoxys, $C_6$ to $C_{20}$ alkylarylamines, $C_6$ to $C_{18}$ alkylaryloxys, and $C_4$ to $C_{12}$ nitrogen containing heterocyclic hydrocarbons, and $C_4$ to $C_{12}$ alkyl substituted nitrogen containing heterocyclic hydrocarbons, and chemically bonded combinations thereof; or are selected from anilinyls, pyridyls, quinolyls, pyrrolyls, pyrimidyls, purinyls, imidazyls, indolyls, $C_1$ to $C_6$ alkyl substituted groups selected from anilinyls, pyridyls, quinolyls, pyrrolyls, pyrimidyls, purinyls, imidazyls, indolyls; $C_1$ to $C_6$ alkylamine substituted groups selected from anilinyls, pyridyls, quinolyls, pyrrolyls, pyrimidyls, purinyls, imidazyls, indolyls, amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, and chemically bonded combinations thereof.

In Structure (VI), a is a linking (or "bridging") moiety that, when present, forms a chemical bond to each of β and γ, or two γ's, thus forming a "γαγ" or "γαβ" ligand bound to M; α may also comprise a Group 14 to Group 16 atom which may be bonded to M through the Group 14 to Group 16 atom. More particularly, α is a divalent bridging group selected from divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent amines, divalent amines, divalent ethers, divalent thioethers, alkylenes, arylenes, alkenylenes, heterocyclic arylenes, alkylarylenes, heteroatom containing alkylenes, heteroatom containing alkenylenes, and heterocyclic hydrocarbonylenes; or α may be selected from $C_1$ to $C_{10}$ alkylenes, $C_2$ to $C_{10}$ alkenylenes, $C_6$ to $C_{12}$ arylenes, $C_1$ to $C_{10}$ divalent ethers, $C_6$ to $C_{12}$ O- or N-containing arylenes, $C_2$ to $C_{10}$ alkyleneamines, $C_6$ to $C_{12}$ aryleneamines, and substituted derivatives thereof.

In Structure (VI), a is an integer from 0 to 2; or a is either 0 or 1; or a is 1; b is an integer from 0 to 2; and g is an integer from 1 to 2. In some embodiments, a is 1, b is 0, and g is 2. M may be selected from Group 3 to Group 12 atoms; or selected from Group 3 to Group 10 atoms; or selected from Group 3 to Group 6 atoms; or selected from Ni, Cr, Ti, Zr, and Hf; or selected from Zr and Hf. Each X is as defined above. n is an integer from 0 to 4; or is an integer from 1 to 3; or is 2 or 3.

As used herein, "chemically bonded combinations thereof" means that adjacent groups, (e.g., β and γ groups) may form a chemical bond between them; for example, the β and γ groups are chemically bonded through one or more α groups there between.

As used herein, the terms "alkyleneamines", "aryleneamines", describe alkylamines and arylamines (respectively) that are deficient by two hydrogens, thus forming chemical bonds with two adjacent γ groups, or adjacent β and γ groups. Thus, an example of an alkyleneamine is —$CH_2CH_2N(CH_3)CH_2CH_2$—, and an example of a heterocyclic hydrocarbylene or aryleneamine is —$C_5H_3N$— (divalent pyridine). An "alkylene-arylamine" is a group such as, for example, —$CH_2CH_2(C_5H_3N)CH_2CH_2$—.

Described another way, the Group 15-containing catalyst component is represented by Structures (VII) and (VIII):

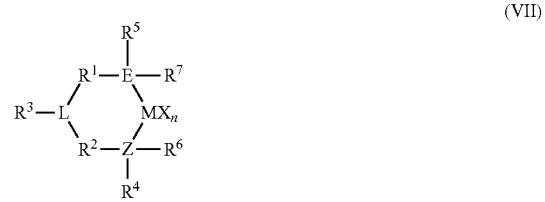

(VII)

(VIII)

wherein E and Z are Group 15 elements independently selected from nitrogen and phosphorus in one embodiment; and nitrogen in a more particular embodiment, L and L' may or may not form a bond with M; y is an integer ranging from 0 to 2 (when y is 0, group L', *R and $R^3$ are absent); M is selected from Group 3 to Group 5 atoms, or Group 4 atoms, or selected from Zr and Hf; n is an integer ranging from 1 to 4, or from 2 to 3; and each X is as defined above.

In Structure (VII), L may be selected from Group 15 atoms, Group 16 atoms, Group 15-containing hydrocarbylenes, and a Group 16-containing hydrocarbylenes; wherein $R^3$ is absent when L is a Group 16 atom. In some embodiments, when $R^3$ is absent, L is selected from heterocyclic hydrocarbylenes; or L is selected from nitrogen, phosphorous, anilinyls, pyridyls, quinolyls, pyrrolyls, pyrimidyls, purinyls, imidazyls, indolyls; $C_1$ to $C_6$ alkyl substituted groups selected from anilinyls, pyridyls, quinolyls, pyrrolyls, pyrimidyls, purinyls, imidazyls, and indolyls; $C_1$ to $C_6$ alkylamine substituted groups selected from anilinyls, pyridyls, quinolyls, pyrrolyls, pyrimidyls, purinyls, imidazyls, indolyls; amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, substituted derivatives thereof, and chemically bonded combinations thereof.

In Structure (VIII), L' is selected from Group 15 atoms, Group 16 atoms, and Group 14 atoms in one embodiment; and selected from Group 15 and Group 16 atoms in a more particular embodiment; and is selected from groups as defined by L above in yet a more particular embodiment, wherein "EZL" and "EZL'" may be referred to as a "ligand", the EZL and EZL ligands comprising the R* and $R^1$-$R^7$ groups;

In Structure (VII), $R^1$ and $R^2$ are independently: divalent bridging groups selected from alkylenes, arylenes, heteroatom containing alkylenes, heteroatom containing arylenes, substituted alkylenes, substituted arylenes and substituted heteroatom containing alkylenes, wherein the heteroatom is selected from silicon, oxygen, nitrogen, germanium, phosphorous, boron and sulfur; or is selected from $C_1$ to $C_{20}$ alkylenes, $C_6$ to $C_{12}$ arylenes, heteroatom-containing $C_1$ to $C_{20}$ alkylenes, and heteroatom-containing $C_6$ to $C_{12}$ arylenes; or is selected from —$CH_2$—, —$C(CH_3)_2$—, —$C(C_6H_5)_2$—, —$CH_2CH_2$—, —$CH_2CH_2CH_2$—, —$Si(CH_3)_2$—, —$Si(C_6H_5)_2$—, —$C_6H_{10}$—, —$C_6H_4$—, and substituted derivatives thereof, the substitutions including $C_1$ to $C_4$ alkyls, phenyl, and halogen radicals.

In Structure (VIII), $R^3$ may be absent; or may be a group selected from hydrocarbyl groups, hydrogen radical, halogen radicals, and heteroatom-containing groups; or may be selected from linear alkyls, cyclic alkyls, and branched alkyls having 1 to 20 carbon atoms.

In Structure (VIII), *R may be absent; or may be a group selected from hydrogen radical, Group 14 atom containing groups, halogen radicals, and heteroatom-containing groups.

In Structures (VII) and (VIII), $R^4$ and $R^5$ are independently: groups selected from alkyls, aryls, substituted aryls, cyclic alkyls, substituted cyclic alkyls, cyclic arylalkyls, substituted cyclic arylalkyls, and multiple ring systems, wherein each group has up to 20 carbon atoms, or between 3 and 10 carbon atoms; or is selected from $C_1$ to $C_{20}$ alkyls, $C_1$ to $C_{20}$ aryls, $C_1$ to $C_{20}$ arylalkyls, and heteroatom-containing groups (for example $PR_3$, where R is an alkyl group).

In Structures (VII) and (VIII), $R^6$ and $R^7$ are independently: absent; or are groups selected from hydrogen radicals, halogen radicals, heteroatom-containing groups and hydrocarbyls; or are selected from linear, cyclic and branched alkyls having from 1 to 20 carbon atoms; wherein $R^1$ and $R^2$ may be associated with one another, and/or $R^4$ and $R^5$ may be associated with one another as through a chemical bond.

The Group 15-containing catalyst component can be described as the embodiments shown in Structures (IX), (X) and (XI) (where "N" is nitrogen):

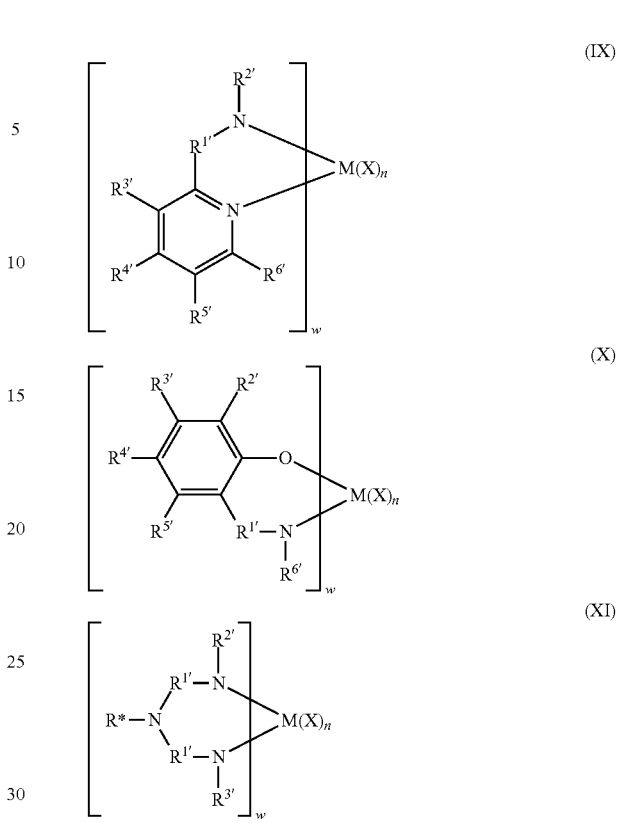

wherein Structure (IX) represents pyridyl-amide structures, Structure (X) represents imino-phenol structures, and Structure (XI) represents bis(amide) structures. In these Structures, w is an integer from 1 to 3, or is 1 or 2, or is 1 in some embodiments. M is a Group 3 to Group 13 element, or a Group 3 to Group 6 element, or Group 4 element in some embodiments. Each X is independently selected from hydrogen radicals, halogen ions (desirably, anions of fluorine, chlorine, and bromine); $C_1$ to $C_6$ alkyls; $C_1$ to $C_6$ fluoroalkyls, $C_6$ to $C_{12}$ aryls; $C_6$ to $C_{12}$ fluoroalkyls, $C_1$ to $C_6$ alkoxys, $C_6$ to $C_{12}$ aryloxys, and $C_7$ to $C_{18}$ alkylaryloxys. n is an integer ranging from 0 to 4, or from 1 to 3, or from 2 to 3, or is 2 in some embodiments.

Further, in Structures (IX), (X), and (XI), $R^1$ may be selected from hydrocarbylenes and heteroatom-containing hydrocarbylenes, or may be selected from —$SiR_2$—, alkylenes, arylenes, alkenylenes and substituted alkylenes, substituted alkenylenes and substituted arylenes; or may be selected from —$SiR_2$—, $C_1$ to $C_6$ alkylenes, $C_6$ to $C_{12}$ arylenes, $C_1$ to $C_6$ substituted alkylenes and $C_6$ to $C_{12}$ substituted arylenes, wherein R is selected from $C_1$ to $C_6$ alkyls and $C_6$ to $C_{12}$ aryls.

Further, in Structures (IX), (X), and (XI), $R^{1'}$ $R^{2'}$, $R^{3'}$, $R^{4'}$, $R^{5'}$, $R^{6'}$ and R* are independently selected from hydride, $C_1$ to $C_{10}$ alkyls, $C_6$ to $C_{12}$ aryls, $C_6$ to $C_{18}$ alkylaryls, $C_4$ to $C_{12}$ heterocyclic hydrocarbyls, substituted $C_1$ to $C_{12}$, alkyls, substituted $C_6$ to $C_{12}$ aryls, substituted $C_6$ to $C_{18}$ alkylaryls, and substituted $C_4$ to $C_{12}$ heterocyclic hydrocarbyls and chemically bonded combinations thereof. In some embodiments, R* is absent. In some embodiments, R*—N represents a nitrogen containing group or ring such as a pyridyl group or a substituted pyridyl group that is bridged by the $R^{1'}$ groups. In some embodiments, R*—N is absent, and the $R^{1'}$ groups form a chemical bond to one another.

In some embodiments of Structures (IX), (X), and (XI), $R^{1'}$ is selected from methylene, ethylene, 1-propylene, 2-propylene, $=Si(CH_3)_2$, $=Si(phenyl)_2$, $—CH=$, $—C(CH_3)=$, $—C(phenyl)_2-$, $—C(phenyl)=$ (wherein "=" represents two chemical bonds), and the like.

In a particular embodiment of Structure (X), $R^{2'}$ and $R^{4'}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 2-methyl-4-chlorophenyl, 2-n-propyl-4-chlorophenyl, 2-iso-propyl-4-chlorophenyl, 2-iso-butyl-4-chlorophenyl, 2-tert-butyl-4-chlorophenyl, 2-methyl-4-fluorophenyl, 2-n-propyl-4-fluorophenyl, 2-iso-propyl-4-fluorophenyl, 2-iso-butyl-4-fluorophenyl, 2-tert-butyl-4-fluorophenyl, 2-methyl-4-bromophenyl, 2-n-propyl-4-bromophenyl, 2-iso-propyl-4-bromophenyl, 2-iso-butyl-4-bromophenyl, 2-tert-butyl-4-bromophenyl, and the like.

In some embodiments of Structures (IX) and (XI), $R^{2'}$ and $R^{3'}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 4-methylphenyl, 4-n-propylphenyl, 4-iso-propylphenyl, 4-iso-butylphenyl, 4-tert-butylphenyl, 4-fluorophenyl, 4-chlorophenyl, 4-bromophenyl, 6-methylphenyl, 6-n-propylphenyl, 6-iso-propylphenyl, 6-iso-butylphenyl, 6-tert-butylphenyl, 6-fluorophenyl, 6-chlorophenyl, 6-bromophenyl, 2,6-dimethylphenyl, 2,6-di-n-propylphenyl, 2,6-di-iso-propylphenyl, 2,6-di-isobutylphenyl, 2,6-di-tert-butylphenyl, 2,6-difluorophenyl, 2,6-dichlorophenyl, 2,6-dibromophenyl, 2,4,6-trimethylphenyl, 2,4,6-tri-n-propylphenyl, 2,4,6-tri-iso-propylphenyl, 2,4,6-tri-iso-butylphenyl, 2,4,6-tri-tert-butylphenyl, 2,4,6-trifluorophenyl, 2,4,6-trichlorophenyl, 2,4,6-tribromophenyl, 2,3,4,5,6-pentafluorophenyl, 2,3,4,5,6-pentachlorophenyl, 2,3,4,5,6-pentabromophenyl, and the like.

In some embodiments of Structures (IX), (X), and (XI), X is independently selected from fluoride, chloride, bromide, methyl, ethyl, phenyl, benzyl, phenyloxy, benzloxy, 2-phenyl-2-propoxy, 1-phenyl-2-propoxy, 1-phenyl-2-butoxy, 2-phenyl-2-butoxy and the like.

Non-limiting examples of the Group 15-containing catalyst component are represented by Structures (XIIa)-(XIII) (where "N" is nitrogen):

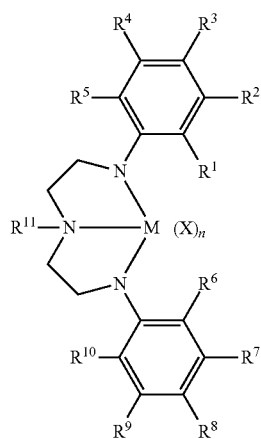
(XIIa)

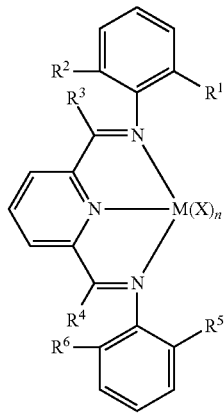
(XIIb)

(XIIc)

(XIId)

(XIIe)

-continued

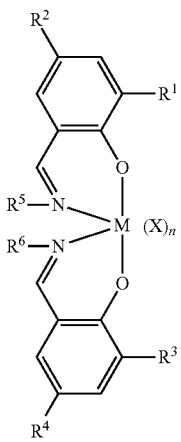

(XIIf)

wherein in Structures (XIIa) through (XIIf), M is selected from Group 4 atoms or is selected from Zr and Hf; and wherein $R^1$ through $R^{11}$ in Structures (XIIa) through (XIII) are selected from hydride, fluorine radical, chlorine radical, bromine radical, methyl, ethyl, n-propyl, isopropyl, n-butyl, isobutyl, tert-butyl and phenyl; and X is selected from fluorine ion, chlorine ion, bromine ion, methyl, phenyl, benzyl, phenyloxy and benzyloxy; and n is an integer ranging from 0 to 4, or from 2 to 3.

The Group 15-containing catalyst components are prepared by methods known in the art, such as those disclosed in, for example, EP 0 893 454 A1, U.S. Pat. Nos. 5,889,128, 6,333,389 B2 and WO 00/37511.

The "Group 15-containing catalyst component" may comprise any combination of any "embodiment" described herein.

Catalysts Comprising Oxadiazoles

In some embodiments, the catalyst system may comprise a catalyst component comprising oxadiazole. For example, the catalyst system may comprise an oxadiazole compound may be represented by Structure (XIII):

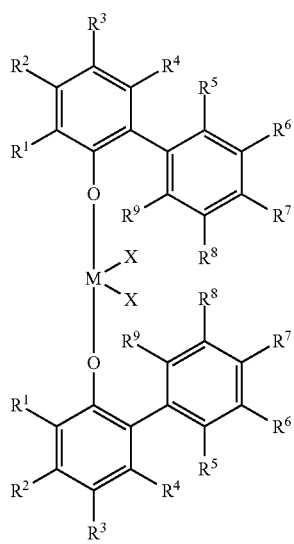

(XIII)

where:
M is selected from Ti, Zr, and Hf;
at least one of $R^1$ through $R^9$ is substituted with a moiety having Structure (XIV):

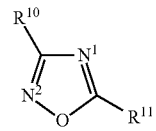

(XIV)

where Structure (XIV) is attached at any one of $R^1$ through $R^9$ at the $R^{10}$ or $R^{11}$ position;
at least one of nitrogen $N^1$ or $N^2$ of Structure (XIV) forms a dative bond with metal M;
each of $R^1$ through $R^{11}$ are independently selected from hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and
X is a leaving group.

Each X in Structure (XIII) is independently selected from: halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof; or is selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls; or is selected from hydride, chloride, fluoride, methyl, phenyl, phenoxy, benzoxy, tosyl, fluoromethyls and fluorophenyls; or is selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls; or is selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or is selected from fluoride, methyl, ethyl, propyl, phenyl, methylphenyl, dimethylphenyl, trimethylphenyl, fluoromethyls (mono-, di- and trifluoromethyls), and fluorophenyls (mono-, di-, tri-, tetra- and pentafluorophenyls).

Other non-limiting examples of X groups in Structure (XIII) include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more X's form a part of a fused ring or ring system.

In some embodiments, catalyst compounds comprising an oxadiazole compound may be represented by Structure (XV):

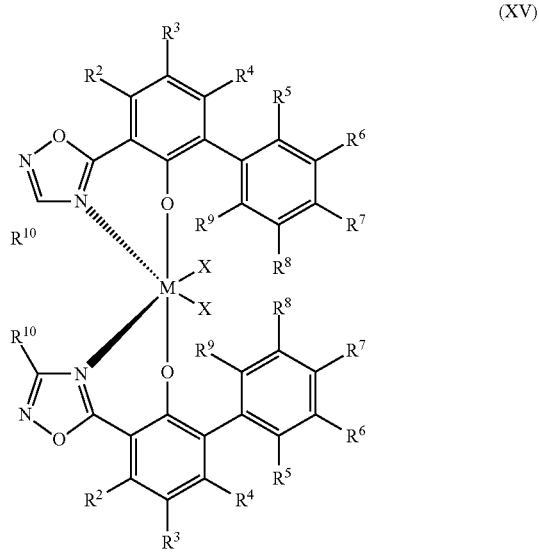

(XV)

where M, X, and $R^2$ through $R^{10}$ are defined as above.

In some embodiments, the catalyst compounds comprising an oxadiazole compound may be represented by Structure (XVI):

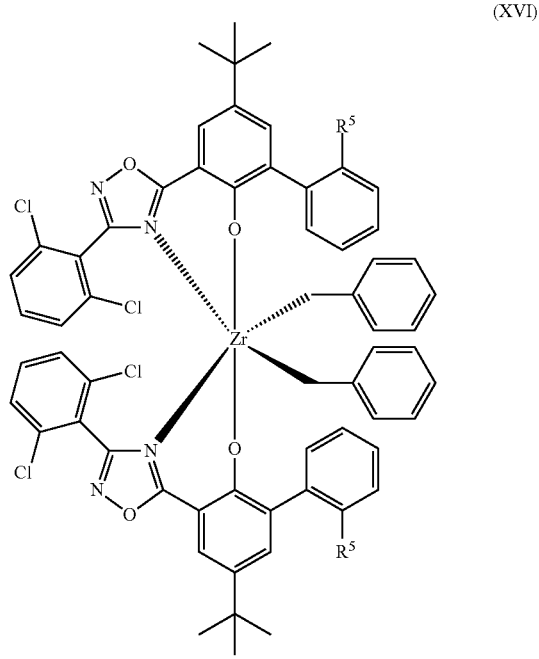

(XVI)

where each $R^5$ is independently selected from hydride and $C_1$ to $C_4$ alkyl. In some embodiments, at least one $R^5$ is hydrogen, or in other embodiments both $R^5$s are hydrogen. In some embodiments, at least one $R^5$ is a methyl, or in other embodiments both each $R^5$s are methyl.

Biphenyl Phenol Catalysts

The catalyst system may comprise a biphenyl phenol catalyst component. Non-limiting examples of suitable biphenyl phenol ("BPP") catalysts are described in U.S. Pat. Nos. 7,091,282, 7,030,256, 7,060,848, 7,126,031, 6,841,502, U.S. Patent Application publication numbers 2006/0025548, 2006/020588, 2006/00211892, and published PCT application numbers WO 2006/020624, WO 2005/108406, and WO 2003/091262.

Preference may be given to BPP catalysts having Structure (XVII) shown below:

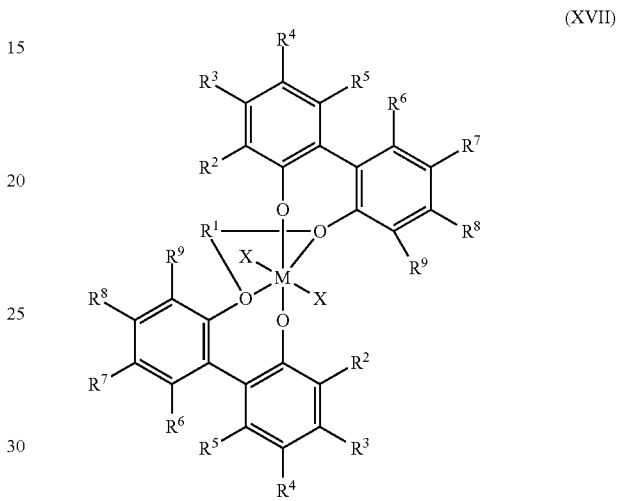

(XVII)

wherein M may be Ti, Zr, or Hf. $R^1$ of Structure (XVII) may be selected from hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, or an amine.

In some embodiments, the bridging group R' of Structure (XVII) is selected from optionally substituted divalent hydrocarbyl and divalent heteroatom containing hydrocarbyl. In other embodiments, $R^1$ is selected from optionally substituted divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkyl thio, divalent arylthio, divalent aryl, divalent substituted aryl, divalent heteroaryl, divalent aralkyl, divalent aralkylene, divalent alkaryl, divalent alkarylene, divalent halide, divalent haloalkyl, divalent haloalkenyl, divalent haloalkynyl, divalent heteroalkyl, divalent heterocycle, divalent heteroaryl, divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether.

In some embodiments, $R^1$ can be represented by the general structure -(Q"$R^{40}_{2-z}$")$_{z'}$— wherein each Q" is either carbon or silicon and each $R^{40}$ may be the same or different from the others such that each $R^{40}$ is selected from hydride and optionally substituted hydrocarbyl, and optionally two or more $R^{40}$ groups may be joined into a ring structure having from 3 to 50 atoms in the ring structure (not counting hydrogen atoms); and z' is an integer from 1 to 10, or from 1 to 5, or from 2 to 5; and z" is 0, 1 or 2. For example, when z" is 2, there is no $R^{40}$ groups associated with Q", which allows for those cases where one Q" is multiply bonded to a second Q". In some embodiments, $R^{40}$ is selected from hydride, halide, and optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, thioxy, alkylthio, arylthio, and combinations thereof. Exemplary $R^1$ groups within these embodiments include —$(CH_2)_2$—, —$(CH_2)_3$—, —$(CH_2)_4$— and —$(CH_2)$—$(C_6H_4)$—$(CH_2)$—.

In some embodiments, $R^2$-$R^9$ of Structure (XVII) are optionally hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, or amine.

Each X in Structure (XVII) is independently selected from: halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof; or is selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls; or is selected from hydride, chloride, fluoride, methyl, phenyl, phenoxy, benzoxy, tosyl, fluoromethyls and fluorophenyls; or is selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls; or is selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or is selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls).

Other non-limiting examples of X groups in Structure (XVII) include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions, and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals, and the like. In some embodiments, two or more X's form a part of a fused ring or ring system.

In some embodiments of the compound represented by Structure (XVII), M may be Ti, Zr, or Hf; $R^1$, $R^3$, $R^5$ through $R^9$ are H; each $R^2$ may be any of alkyl, aryl, or heteroaryl; each $R^4$ may be any of H, alkyl, aryl; and each X may be any of F, Cl, Br, I, Me, Bnz, $CH_2SiMe_3$, or C1 to C5 alkyls.

In some embodiments of the compound represented by Structure (XVII), M may be Ti, Zr, or Hf; $R^1$ may be any of $CH_2CH_2$, $(CH_2)_3$, $(CH_2)_4$, $CH_2CHMeCH_2$, $CH_2CMe_2CH_2$, $Me_2Si$, $CH_2SiMe_2CH_2$; each $R^2$ may be any of an aryl group, defined here to bind through the 1-position to the BPP ring, with substituents in the 2-position or substituents in the 2 and 6 positions such as 2,4-$Me_2Ph$, 2,5-$Me_2Ph$, 2,6-$Me_2Ph$, 2,6-$Et_2Ph$, 2,6-$Pr_2$-Ph, 2,6-$Bu_2Ph$, 2-MeNapthyl, 2,4,6-$Me_3Ph$, 2,4,6-$Et_3Ph$, 2,4,6-$Pr_3Ph$, carbazole and substituted carbazoles; $R^3$ and $R^5$ through $R^9$ are H; each $R^4$ may be any of H, Methyl, Ethyl, Propyl, Butyl, Pentyl; and each X may be any of F, Cl, Br, I, Me, Bnz, $CH_2SiMe_3$, or C1 to C5 alkyls.

In some embodiments, M may be either Zr or Hf; and X may be any of F, Cl, Br, I, Me, Bnz, or $CH_2SiMe_3$. In some embodiments, M may be either Zr or Hf; $R^1$ may be either $(CH_2)_3$ or $(CH_2)_4$; each $R^2$ may be any of 2,6-Me2Ph, 2,6-Et2Ph, 2,6-Pr2-Ph, 2,6-Bu2Ph, 2-MeNapthyl, 2,4,6-Me3Ph, 2,4,6-Et3Ph, 2,4,6-Pr3Ph, and carbazole; each $R^4$ may be any of H, methyl, or butyl; and X may be any of F, Cl, or Me. In some embodiments, the $R^1$ is $(CH_2)_3$; each $R^3$ is either 2,4,6-Me3Ph or 2-MeNapthyl; each $R^4$ is $CH_3$; X is Cl; and M is Zr.

Mixed Catalysts

The catalyst system can include a mixed catalyst, which can be a bimetallic catalyst composition, or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one preferred example, the mixed catalyst includes at least one metallocene catalyst compound and at least one non-metallocene catalyst compound.

Spray-Dried Activators

In addition to the catalyst components described above, the catalyst systems may further comprise a spray-dried activator. The spray-dried activator may comprise an activator and a filler material which may be mixed or otherwise combined and then spray dried. As used herein, the term "activator" refers to any compound or component, or combination of compounds and components, capable of enhancing the ability of a catalyst to oligomerize or polymerize unsaturated monomers, such as olefins. It should be understood that the catalyst systems may be activated for oligomerization and/or polymerization catalysis in any manner sufficient to allow coordination or cationic oligomerization and or polymerization.

The catalyst systems may also comprise a spray-dried activator comprising one or more catalyst components. Such a mixture may be prepared by combining an activator, filler material, diluent, and catalyst component to produce a suspension, spray drying the suspension to produce a spray-dried activator comprising one or more catalyst components, and then combining the spray-dried activator comprising one or more catalyst components with one or more additional catalyst components to produce the catalyst system. The one or more catalyst components and one or more additional catalyst components may be or comprise any of the catalyst components described above.

The activator can include a Lewis acid or a non-coordinating ionic activator or ionizing activator, or any other compound including Lewis bases, aluminum alkyls, and/or conventional-type cocatalysts. The activator can include one or more organoaluminum compounds. The activator can include aluminoxanes and modified aluminoxanes. For example, the activator can be or include methylaluminoxane ("MAO") and/or modified methylaluminoxane ("MMAO"). Other illustrative activators can include, but are not limited to, ionizing compounds, neutral or ionic, such as tri(n-butyl)ammonium tetrakis(pentafluorophenyl)boron, trisperfluorophenyl boron, trisperfluoronaphthyl boron, or any combinations thereof.

In preferred embodiments, the activator comprises an aluminoxane or modified aluminoxane. Aluminoxanes can be described as oligomeric aluminum compounds having —Al(R)—O— subunits, where R is an alkyl group. Examples of aluminoxanes include, but are not limited to, MAO, MMAO, polymethylaluminoxane ("PMAO"), ethylaluminoxane, isobutylaluminoxane, or a combination thereof. One or more trialkylaluminum compounds can be used in lieu of or in conjunction with one or more aluminoxanes. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, diethylaluminum ethoxide, tributylaluminum, diisobutylaluminum hydride, and the like.

Aluminoxanes can be produced by the hydrolysis of the respective trialkylaluminum compound. MMAO can be produced by the hydrolysis of trimethylaluminum and a higher trialkylaluminum such as triisobutylaluminum. There are a variety of methods for preparing aluminoxanes and modified aluminoxanes, non-limiting examples can be as described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; and EP 0561476; EP 0279586; EP 0594218; and EP 0586665; and WO Publications WO 94/10180 and WO 99/15534.

A visually clear MAO can be used. For example, a cloudy and/or gelled aluminoxane can be filtered to produce a clear aluminoxane or clear aluminoxane can be decanted from a cloudy aluminoxane solution. In additional examples, a cloudy and/or gelled aluminoxane can be used.

Another aluminoxane can include a modified methyl aluminoxane ("MMAO") type 3A (commercially available from Akzo Chemicals, Inc. under the trade name Modified Methylaluminoxane type 3A. MMAO is further described in U.S. Pat. No. 5,041,584.

A suitable source of MAO can be a solution having from about 1 wt % to about a 50 wt % MAO, for example. Commercially available MAO solutions can include the 10 wt % and 30 wt % MAO solutions available from Albemarle Corporation of Baton Rouge, La.

An ionizing or stoichiometric activator, neutral or ionic, such as tri(n-butyl)ammonium tetrakis(pentafluorophenyl) boron, trisperfluorophenyl boron or trisperfluoronaphthyl boron, polyhalogenated heteroborane anions (WO Publication WO 98/43983), boric acid (U.S. Pat. No. 5,942,459), or combinations thereof can be used. The activator can include neutral or ionic compounds, alone or in combination with aluminoxanes and/or modified aluminoxanes.

Examples of neutral stoichiometric activators can include tri-substituted boron, tellurium, aluminum, gallium, indium, or any combination thereof. The three substituent groups can each be independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having from 1 to 20 carbon atoms, alkyl groups having from 1 to 20 carbon atoms, alkoxy groups having from 1 to 20 carbon atoms and aryl groups having from 3 to 20 carbon atoms (including substituted aryls). More preferably, the three groups are alkyls having from 1 to 4 carbon groups, phenyl, naphthyl or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Non-coordinating anions can also be used, which can sometimes be referred to as weakly coordinating anions. The term "non-coordinating anion" ("NCA") refers to an anion which either does not coordinate to a cation or which is only weakly coordinated to a cation thereby remaining sufficiently labile to be displaced by a neutral Lewis base. "Compatible" non-coordinating anions refer to those which are not degraded to neutrality when the initially formed complex decomposes. Illustrative non-coordinating anions can be or include those that are compatible, stabilize the metal cation in the sense of balancing its ionic charge, yet retain sufficient ability to permit displacement by an ethylenically or acetylenically unsaturated monomer during polymerization.

Illustrative anions can be as described in U.S. Pat. No. 5,278,119, and WO Publications WO 2002/102857; WO 2002/051884; WO 2002/018452; WO 2000/037513; WO 2000/029454; WO 2000/004058; WO 99/064476; WO 2003/049856; WO 2003/051892; WO 2003/040070; WO 2003/000740; WO 2002/036639; WO 2002/000738; WO 2002/000666; WO 2001/081435; WO 2001/042249; and WO 2000/004059.

Activators for conventional-type transition metal catalysts can be represented by the structure $M_3M_{4v}X_{2c}R_{3b-c}$, where $M_3$ is a metal from Group 1 to 3 or 12 to 13; $M_4$ is a metal of Group 1; v is a number from 0 to 1; each $X_2$ is any halogen; c is a number from 0 to 3; each $R_3$ is a monovalent hydrocarbon radical or hydrogen; b is a number from 1 to 4; and where b minus c is at least 1. Other conventional-type organometallic compounds for the above conventional-type transition metal catalysts can have the structure $M_3R_{3k}$, where $M_3$ is a Group IA, IIA, IIB or IIIA metal, such as lithium, sodium, beryllium, barium, boron, aluminum, zinc, cadmium, and gallium; k equals 1, 2, or 3 depending upon the valency of $M_3$ which valency in turn normally depends upon the particular Group to which $M_3$ belongs; and each $R_3$ can be any monovalent radical that include hydrocarbon radicals and hydrocarbon radicals containing a Group 13 to 16 element like fluoride, aluminum or oxygen or a combination thereof.

The ratio of the activator to the catalyst component in the catalyst system can range from about 0.5:1 to about 100,000:1, based on moles of activator to moles of catalyst. In another example, the amount of activator in the catalyst system can range from about 10:1 to about 10,000:1, from about 50:1 to about 5,000:1, or from about 100:1 to about 1,000:1 based on moles of activator to moles of catalyst.

If the activator is an aluminoxane, the amount of the aluminoxane can be determined based on the amount of aluminum (Al) contained in the aluminoxane. The aluminoxane can be present in the catalyst system in an amount of about 10 mmol or less, about 9 mmol or less, about 8 mmol or less, about 7 mmol or less, about 6 mmol or less, about 5 mmol or less, about 4 mmol or less, about 3 mmol or less, about 2 mmol or less, about 1 mmol or less, about 0.5 mmol or less, or about 0.1 mmol or less per gram of the catalyst system. If the activator is an aluminoxane, the aluminoxane can be present in the catalyst system in an amount ranging from a low of about 0.1 mmol, about 0.5 mmol, about 1 mmol, about 2 mmol, about 3 mmol, about 4 mmol, about 5 mmol, about 5.5 mmol, or about 6 mmol to a high of about 6.5 mmol, about 7 mmol, or about 7.5 mmol per gram of the catalyst system.

Any solid material that is inert or partially inert to the other components of the catalyst system and subsequent polymerization can be used as the filler material. The filler material can be or include solid, finely dispersed particulates. The filler material can provide bulk and/or strength to the spray-dried activator. The filler material can also reduce or prevent spray dried activator particles or particulates from disintegrating. Illustrative filler materials can include, but are not limited to, silica (e.g. fumed silica), alumina (e.g. fumed alumina), boron nitride, titanium dioxide, zinc oxide, polystyrene, calcium carbonate, or any combination thereof. Fumed, hydrophobic, surface modified, silica ("fumed silica") can be used as the filler material, in some embodiments, because it can impart increased viscosity to the slurry and good strength to the spray dried activator particles. The filler material can be free of absorbed water. The filler material can be surface modified. For example, the filler material can be surface modified via a silane treatment that can remove at least some of the reactive hydroxyl or other functional groups therefrom. The silane treatment can include treating the filler material with dimethyldichlorosilane.

The filler material is not required to provide or act as an inert support for the catalyst compound. In other words, the catalyst compound does not need to be supported by the filler material. In another example, the filler material is not required to provide or act as an inert support for the catalyst compound and activator. In other words, the catalyst compound and activator do not need to be supported by the filler material. Accordingly, filler materials having high internal porosity are not essential for use with the catalyst compound, the activator, or the combination thereof. The filler material can have a pore volume of less than about 3 cm$^3$/g, less than about 2 cm$^3$/g, less than about 1 cm$^3$/g, or less than about 0.5 cm$^3$/g.

The filler material can have an average particle size of less than about 150 microns, less than about 120 microns, less than about 100 microns, less than about 75 microns, or less than about 50 microns. For example, the average particle size of the filler material can range from a low of about 0.05 microns, about 0.1 microns, about 1 microns, or about 5 microns to a high of about 40 microns, about 60 microns, about 80 microns, about 100 microns, or about 150 microns. In another example, the filler material can have an average particle size from about 0.1 microns to about 80 microns, about 0.1 microns to about 50 microns, or about 0.1 microns to about 20 microns. Suitable filler materials can include, but are not limited to, Cabosil TS-610, Cabosil M-5, or a combination thereof, both available from Cabot Corporation.

Spray-Dry Process

Preparation of the spray-dried activator can include mixing or otherwise combining an activator, a filler material, and a diluent to produce a suspension. The suspension can then be spray dried to produce the spray dried activator. Preparation of the spray-dried activator comprising one or more catalyst components can include mixing or otherwise combining an activator, filler material, diluent, and one or more catalyst components to produce a suspension and spray drying the suspension to produce the spray-dried activator comprising one or more catalyst components.

The components of the suspension can be combined in any suitable order or sequence. For example, the diluent or a portion of the diluent, the filler material, the activator, and optionally one or more catalyst components can be combined. The one or more catalyst components may also be combined with a diluent prior to addition of the activator and/or filler material. The one or more catalyst components and activator may each be combined with a diluent and then combined with each other.

The mixture can be stirred or otherwise mixed for a period of time ranging from about 1 minute to about 48 hours. The mixture can be mixed at a temperature ranging from room temperature up to a temperature of about 40° C., about 60° C., about 80° C., or about 100° C. The mixture can be mixed under an inert atmosphere such as nitrogen.

The diluent can be or include any material capable of dissolving or suspending the activator and suspending the filler material. Non-limiting examples of diluents can include, but are not limited to, linear and/or branched alkanes such as ethane, propane, butane, isobutene, pentane, isopentane, hexane, heptane, octane, decane, dodecane, hexadecane, octadecane, and the like; alicylic hydrocarbons such as cyclopentane, methylcyclopentane, cyclohexane, cyclooctane, norbornane, ethylcyclohexane, and the like; aromatic hydrocarbons such as benzene, toluene, ethylbenzene, propylbenzene, butylbenzene, xylene, and the like; petroleum fractions such as gasoline, kerosene, light oils, and the like. Likewise, halogenated hydrocarbons such as methylene chloride, dichloromethane, chlorobenzene, and the like, can also be used. Any two or more diluents can be used together to provide the diluent. The diluent can have a boiling point ranging from about 0° C. to about 150° C.

The particular amount or concentration of the various components of the catalyst system in the suspension can vary depending, at least in part, on the particular activator, filler material, and/or diluent present therein. For example, the suspension can have a concentration of the filler material ranging from a low of about 1 wt %, about 3 wt % or about 5 wt % to a high of about 10 wt %, about 15 wt %, or about 20 wt %. In additional examples, the suspension can have a concentration of the filler material of from about 3 wt % to about 8 wt %, about 4 wt % to about 7 wt %, or about 5 wt % to about 6 wt %. The suspension can have a concentration of the activator ranging from a low of about 1 wt %, about 2 wt %, or about 3 wt % to a high of about 6 wt %, about 8 wt %, or about 10 wt %. The suspension can have a diluent concentration ranging from a low of about 70 wt %, about 75 wt %, or about 80 wt % to a high of about 90 wt %, about 95 wt %, or about 98 wt %.

The suspension can be atomized and introduced into a stream of heated, inert drying gas such as nitrogen, argon, propane, and the like, or any combination thereof to evaporate the diluent and produce solid-form particles of the activator in a matrix of the filler material. The volumetric flow of the drying gas can be greater than the volumetric flow of the suspension. The suspension can be atomized using any suitable device(s), system(s), or combination of device(s) and/or system(s). For example, the suspension can be atomized via an atomizing nozzle or a centrifugal high speed disc atomizer.

Atomization of the suspension via an atomizing nozzle can also include mixing the suspension with an atomizing gas. The temperature of the atomizing nozzle can be at or above the boiling point of the highest boiling component of the suspension. The atomized suspension can be introduced to a drying chamber where the volatiles can dry in the presence of the heated, inert drying gas. If any spray dried activator particles having an undesirably large diameter are produced, at least a portion of those over-sized particles can be separated within a collection zone of the drying chamber. Spray dried particles having a desired size can be recovered from the drying chamber and can then be separated from the inert drying gas. For example, the spray dried activator particles and the drying gas can be separated within a cyclone. Other suitable spray-dry processes can be similar to those discussed and described in, for example, U.S. Pat. Nos. 4,638,029; 4,728,705; 5,290,745; 5,306,350; 5,604,172; 5,716,558; 6,982,236; and U.S. Patent Application Publication Nos. 2006/0293470 and 2007/0191215.

Spray drying produces discrete particles or particulates after evaporation of the diluent. The amount of filler present in the spray-dried activator or spray-dried activator comprising one or more catalyst components can range from a low of about 5 wt %, about 10 wt %, about 15 wt %, or about 20 wt % to a high of about 50 wt %, about 60 wt %, about 70 wt %, or about 80 wt %, based on total weight of the spray dried activator. For example, the spray-dried activator or spray-dried activator comprising one or more catalyst components can contain from about 50 wt % to about 70 wt %, from about 52 wt % to about 65 wt %, or from about 54 wt % to about 60 wt %, based on the total weight of the filler material and the activator(s).

The spray-dried activator or spray-dried activator comprising one or more catalyst components can have an average particle size ranging from about 1 micron to about 500 microns. For example, the spray-dried activator or spray-dried activator comprising one or more catalyst components can have an average particle size ranging from a low of about 1 micron, about 5 microns, or about 10 microns to a high of about 50 microns, about 80 microns, or about 100 microns. In additional examples, the spray-dried activator or spray-dried activator comprising one or more catalyst components can have an average particle size of from about 5 microns to about 100 microns, from about 10 microns to about 80 microns, from about 10 microns to about 70 microns, or from about 10 microns to about 30 microns. The spray-dried activator or spray-dried activator comprising one or more catalyst components can have a bulk density ranging from a low of about 0.2 g/cm$^3$, about 0.24 g/cm$^3$, or about 0.28 g/cm$^3$ to a high of about 0.32 g/cm$^3$, about 0.35 g/cm$^3$, or about 0.38 g/cm$^3$.

Preparation of the Catalyst System

Where the catalyst system comprises the spray-dried activator, preparation of the catalyst system can include mixing or otherwise combining the spray-dried activator and the catalyst component to load the catalyst component onto the spray dried activator. Where the catalyst system comprises the spray-dried activator comprising one or more catalyst components, preparation of the catalyst system can include preparing the spray-dried activator comprising one or more catalyst components, introducing the spray-dried activator comprising one or more catalyst components to the reactor, and separately introducing one or more additional catalyst components to the reactor. The one or more second additional catalyst components separately introduced to the reactor can act as a trim and interact with the spray-dried activator comprising one or more catalyst components to form the catalyst system in the reactor.

The components of the catalyst system can be combined in any suitable order or sequence. The spray-dried activator may be combined with a diluent prior to the addition of the catalyst component. Alternatively, a catalyst component may be combined with the diluent prior to the addition of the spray-dried activator. Furthermore, the spray-dried activator and a catalyst component may each be combined with a diluent and then combined with one another.

The mixture of the catalyst component, the spray-dried activator, and the diluent can be stirred or otherwise mixed for a period of time ranging from about 5 seconds to about 48 hours, or from about 10 minutes to about 10 hours, or from about 30 minutes to about 6 hours. The mixture can be mixed at a temperature ranging from room temperature up to a temperature of about 40° C., about 60° C., about 80° C., or about 100° C. The mixture can be mixed under an inert atmosphere such as nitrogen.

The diluent can be or include any material capable of dissolving or suspending the catalyst and suspending the spray-dried activator. The diluent can be inert or non-reactive with the catalyst system. Non-limiting examples of suitable diluents include, but are not limited to, aliphatic hydrocarbons, aromatic hydrocarbons, or a combination thereof. For example, the diluent can be or include a mineral oil. Non-limiting examples of diluents can further include, but are not limited to, linear and/or branched alkanes such as ethane, propane, butane, isobutene, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane, and the like; aromatic hydrocarbons such as benzene, toluene, ethylebenzene, propylbenzene, butylbenzene, xylene, and the like; petroleum fractions such as gasoline, kerosene, light oils, and the like. Likewise, halogenated hydrocarbons such as methylene chloride, dichloromethane, chlorobenzene, and the like, can also be used. Any two or more diluents can be used together to provide the diluent. The diluent can have a boiling point ranging from about 0° C. to about 150° C.

In some embodiments, the diluent can include a mixture of mineral oil and aliphatic hydrocarbons. For example, the concentration of mineral oil in the diluent can range from a low of about 60 wt %, about 70 wt %, or about 75 wt % to a high of about 80 wt %, about 90 wt %, or about 99 wt %. The concentration of aliphatic hydrocarbons not contained in the mineral oil can range from a low of about 1 wt %, about 5 wt %, or about 10 wt % to a high of about 20 wt %, about 30 wt %, or about 40 wt %. The ratio of mineral oil to aliphatic hydrocarbons not contained in the mineral oil can range from about 1.5:1 to about 100:1, from about 2:1 to about 50:1, from about 3:1 to about 25:1, or from about 5:1 to about 10:1. A suitable, commercially available mineral oil can be or include Hydrobrite 380, available from BASF. A suitable, commercially available aliphatic/isoparaffinic hydrocarbon can be or include Isopar C, available from ExxonMobil Chemical Company.

The particular amount or concentration of the various components in the catalyst system can vary depending, at least in part, on the particular catalyst(s), activator(s), filler material(s), and/or diluent(s) present therein. For example, the catalyst system can have a concentration of the spray-dried activator ranging from a low of about 1 wt %, about 3 wt % or about 5 wt % to a high of about 10 wt %, about 15 wt %, about 20 wt %, about 25 wt %, about 30 wt %, about 40 wt %, to about 50 wt %. In additional examples, the catalyst system can have a concentration of the spray-dried activator of from about 3 wt % to about 8 wt %, about 4 wt % to about 7 wt %, or about 5 wt % to about 6 wt %. The catalyst system can have a concentration of the catalyst component ranging from a low of about 0.05 wt %, about 0.09 wt %, or about 0.15 wt % to a high of about 0.4 wt %, about 0.8 wt %, about 1.2 wt %, about 1.5 wt %, about 2 wt %, about 3 wt %, or about 5 wt %. In additional examples, the catalyst system can have a concentration of the catalyst ranging from about 0.13 wt % to about 0.22 wt %, about 0.14 wt % to about 0.2 wt %, or about 0.15 wt % to about 0.19 wt %. The catalyst system can have a diluent concentration ranging from a low of about 70 wt %, about 75 wt %, or about 80 wt % to a high of about 90 wt %, about 95 wt %, or about 98 wt %.

The catalyst system can be used in a dry or substantially dry state or as a slurry. In some embodiments, the catalyst system comprising the mixture of the spray-dried activator and the catalyst can be dried and then re-slurried in a diluent prior to its use in a polymerization process. In some embodiments, solid particles of the catalyst supported on the spray-dried activator can be filtered from the mixture and then re-slurried in a diluent prior to use in a polymerization process.

Continuity Additives

In the polymerization processes disclosed herein, it may also be desired to additionally use a continuity additive to aid in regulating static levels in the reactor. As used herein, the term "continuity additive" refers to a compound or composition that, when introduced into a fluidized bed reactor, may influence or drive the static charge (negatively, positively, or to zero) in the fluidized bed.

The specific continuity additive used may depend at least in part upon the nature of the static charge, the particular polymer being produced, and/or the particular catalyst being used. Examples of suitable continuity additives and use thereof are described in European Patent No. 0229368; U.S. Pat. No. 5,283,278; and WO Publication No. WO2009/023111.

If the static charge is negative, then continuity additives such as positive charge generating compounds can be used. Illustrative positive charge generating continuity additives can include, but are not limited to, MgO, ZnO, $Al_2O_3$, CuO, alcohols, oxygen, nitric oxide, or combinations thereof. Other continuity additives suitable for controlling negative static charges can be as described in U.S. Pat. Nos. 4,803,251 and 4,555,370.

If the static charge is positive, then continuity additives such as negative charge generating compounds can be used. Illustrative negative charge generating continuity additives can include, but are not limited to, $V_2O_5$, $SiO_2$, $TiO_2$, $Fe_2O_3$, water, ketones containing up to 7 carbon atoms, or combinations thereof.

A suitable continuity additive can include aluminum distearate, which can be used alone or in combination with any other suitable continuity additives. Other suitable continuity additives can include, but are not limited to, aluminum distearate, ethoxylated amines, ethylenimine copolymers, or any combination thereof. Suitable, commercially available continuity additives can include, for example Irgastat AS-990 available from Huntsman and Lupasol FG available from BASF.

Still other continuity additives can include polyethylenimines having the structure —$(CH_2-CH_2-NH)_n$—, where n can be from 10 to 10,000. The polyethylenimines can be linear, branched, or hyperbranched (i.e., forming dendritic or arborescent polymer structures).

Any of the aforementioned continuity additives, as well as those described in, for example, WO Publication No. WO01/44322 and listed under the heading Carboxylate Metal Salt, including those chemicals and compositions listed as antistatic agents can be used either alone or in combination with any other continuity additive. For example, the carboxylate metal salt can be combined with an amine containing control agent. For example, a carboxylate metal salt with any family member belonging to the KEMAMINE® (available from Crompton Corporation) or ATMER (available from ICI America Inc.) family of products.

The continuity additive can be introduced to the reactor as a combination of two or more of the above listed continuity additives. The continuity additive(s) can be introduced to the reactor in the form of a solution or slurry. The continuity additive can be introduced to the reactor as an individual feed or can be combined with other feeds prior to introduction to the reactor. For example, the continuity additive can be combined with the catalyst system and/or the catalyst slurry prior to introducing the combined catalyst slurry/continuity additive mixture to the reactor.

The continuity additive can be introduced to the reactor separate from the catalyst slurry. In other words, the continuity additive and the catalyst slurry can be contacted within the reactor. In additional examples, the continuity additive can be mixed with the catalyst slurry and then introduced to the reactor as a mixture. In other words, the continuity additive and the catalyst slurry can be contacted outside the reactor. In still another example, a first portion of the continuity additive can be mixed with the catalyst slurry and introduced to the reactor and a second portion of the continuity additive can be introduced separately to the reactor. In other words, a first portion of the continuity additive and the catalyst slurry can be contacted outside the reactor and a second portion of the continuity additive can be contacted within the reactor with the mixture of the catalyst slurry and first portion of the continuity additive.

Suitable diluents for producing a continuity additive slurry or solution can include liquids that are inert or non-reactive with the catalyst system. Illustrative diluents can include, but are not limited to, aliphatic hydrocarbons, aromatic hydrocarbons, or a combination thereof. The one or more diluents can be or include a mineral oil or other light hydrocarbons.

The amount of continuity additive introduced to the reactor and/or the catalyst slurry can be sufficient to provide a continuity additive concentration of from about 0.05 ppmw to about 200 ppmw, based on the polymer production rate. For example, the continuity additive can be introduced to the reactor, i.e. directly to the reactor and/or combined with the catalyst slurry, in an amount ranging from a low of about 1 ppmw, about 2 ppmw, or about 3 ppmw to a high of about 35 ppmw, about 45 ppmw, or about 55 ppmw, based on the polymer production rate. The amount of continuity additive introduced to the reactor can depend, at least in part, on the particular catalyst system, reactor pre-conditioning such as coatings to control static buildup, and/or other factors.

Polymerization Process

The polymerization processes may include polymerization of olefins in the presence of a catalyst system comprising a catalyst component supported on a spray-dried activator.

Polymerization processes may also include polymerization of olefins in the presence of a catalyst system comprising a spray-dried activator comprising one or more catalyst components, wherein the spray-dried activator comprising one or more catalyst components is introduced to the reactor, and one or more additional catalyst components is separately introduced to the reactor as a trim or otherwise. This approach can enable easier catalyst transitions. For example, when using mixed catalysts, one can easily change the one or more additional catalyst components by simply transitioning from one trim to another. Additionally, this approach provides a way for using mixed catalysts where one or more components cannot be effectively activated under spray-drying conditions, for example, due to thermal instability.

Any polymerization process including, but not limited to, high pressure, solution, slurry, and/or gas phase processes can be used. Preferably, a gas phase process utilizing a fluidized bed reactor is used to polymerize ethylene and one or more optional comonomers to provide a polyethylene. More preferably, a continuous gas phase process utilizing a fluidized bed reactor is used to polymerize ethylene and one or more optional comonomers to provide a polyethylene.

The term "polyethylene" refers to a polymer having at least 50 wt % ethylene-derived units, preferably at least 70 wt % ethylene-derived units, more preferably at least 80 wt % ethylene-derived units, or 90 wt % ethylene-derived units, or 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefins) and/or comonomer(s). Suitable comonomers can contain 3 to 16 carbon atoms in one example; from 3 to 12 carbon atoms in another example; from 4 to 10 carbon atoms in another example; and from 4 to 8 carbon atoms in yet another example. Other suitable polyethylenes can include copolymers of ethylene and one or more $C_3$-$C_{20}$ alpha olefins, $C_3$ to $C_{12}$ alpha olefins, or $C_4$ to $C_8$ alpha olefins. Illustrative comonomers include, but are not limited to, propylene, 1-butene, 1-pentene, 1-hexene, 1-heptene, 1-octene, 4-methylpent-1-ene, 1-decene, 1-dodecene, and 1-hexadecene.

Preferred examples of polyethylene products include ultra low density polyethylene ("ULDPE"), very low density polyethylene ("VLDPE"), linear low density polyethylene ("LLDPE"), low density polyethylene ("LDPE"), medium density polyethylene ("MDPE"), high density polyethylene ("HDPE"), random copolymer of ethylene and propylene and/or 1-butene and/or 1-hexene, elastomers such as ethylene propylene rubber, ethylene propylene diene monomer rubber, neoprene, and blends of thermoplastic polymers and elastomers, such as for example, thermoplastic elastomers, and rubber toughened plastics.

A suitable gas phase fluidized bed reactor can include a reaction zone and a so-called velocity reduction zone. The reaction zone can include a bed of growing polymer particles, formed polymer particles and a minor amount of catalyst particles fluidized by the continuous flow of the gaseous monomer and optionally one or more induced condensing agents ("ICAs") to remove heat of polymerization from the reaction zone. Optionally, some of the re-circulated gases, e.g. ICAs can be cooled and compressed to form liquids that increase the heat removal capacity of the circulating gas stream when readmitted to the reaction zone. Illustrative ICAs can include, but are not limited to, propane, butane, isobutane, pentane, isopentane, hexane, isomers thereof, derivatives thereof, and combinations thereof.

A suitable rate of gas flow can be readily determined by simple experiment. The rate of gas flow or the superficial gas velocity can preferably be at least two times a minimum flow velocity, i.e. the minimum flow rate required to maintain a fluidized bed. The superficial gas velocity can range from about 0.3 m/s to about 2 m/s, about 0.35 m/s to about 1.7 m/s, or from about 0.4 m/s to about 1.5 m/s. Ordinarily, the superficial gas velocity does not exceed 1.5 m/s and usually no more than 0.76 m/s is sufficient.

Make-up of gaseous monomer to the circulating gas stream can be at a rate equal to or substantially equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone can be passed to the velocity reduction zone where entrained particles are removed. Finer entrained particles and dust can be removed in a cyclone and/or fines filter. The gas can be passed through a heat exchanger where at least a portion of the heat of polymerization can be removed, compressed in a compressor, and then returned to the reaction zone.

A catalyst slurry can be introduced or delivered to the reactor using any suitable device, system, or combination of devices and/or systems. One example of a catalyst slurry delivery system can include one or more effervescent nozzles in which a stream of liquid or gas can flow through an inner tube, while the catalyst slurry can flow co-currently through an annular space defined by the inner tube and a concentric outer tube. The direction of flow of the liquid and/or gas is generally along the central axis of the tubes. For example, the catalyst slurry can flow through the annular space and a gas such as nitrogen can flow through the inner tube. The catalyst slurry and gas can mix within the annular space toward a distal end of the nozzle. For example, toward the distal end or tip of the inner tube, though not necessarily at the end, there can be holes or orifices that allow the gas to enter the catalyst slurry. The gas can be introduced into the co-current flowing catalyst slurry near a common exit orifice of the nozzle. In this way, catalyst slurry slugging can be prevented and steady droplet formation can be promoted. Gas bubbles that form upon mixing the gas and catalyst slurry can be forced through an orifice at the tip of the outer tube, forcing the concurrent flow of catalyst slurry along the outside edge of the orifice. A thin film of catalyst slurry on the orifice wall can be ejected from the orifice in thin sheets which disintegrate into small droplets within the fluidized bed polymerization reactor. As such, the effervescent nozzle can cause the catalyst slurry to disperse into small droplets upon exiting the effervescent nozzle. Other suitable effervescent nozzles suitable for introducing the catalyst slurry to the reactor can be similar to those discussed and described in U.S. Pat. Nos. 5,962,606 and 6,075,101; European Patent No. 0961784B1; and WO Publication Nos. WO 98/37101; WO 2008/042078A1; WO 2008/042177A1; and WO 2008/042182A1.

Another example of a catalyst slurry delivery system can include one or more effervescent nozzles in which a stream of liquid or gas can flow through a first or "inner" conduit, the catalyst slurry can flow through an annulus formed between the first conduit and a second or "intermediate" conduit, and a feed stream can flow through an annulus formed between the second conduit and a third or "outer" conduit. The liquid or gas flowing through the first or inner conduit can mix or otherwise combine with the catalyst slurry similar as discussed above. The feed stream and the catalyst slurry/gas or liquid mixture can contact one another within the reactor. The effervescent nozzle suitable for introducing the catalyst slurry and the feed stream to the reactor can be similar to the nozzle discussed and described in U.S. Patent Application Publication No. 2010/0041841.

The continuity additive can be mixed with the catalyst slurry and introduced via one or more of the effervescent nozzles. The continuity additive can be mixed with the gas that can be introduced separately from the catalyst slurry via the effervescent nozzle and then combined or mixed with the catalyst slurry within the effervescent nozzle(s). The continuity additive can be introduced to the fluidized bed via one or more independent nozzles or other suitable introduction devices such that the continuity additive contacts the catalyst slurry within the fluidized bed.

Hydrogen gas can be used in olefin polymerization to control the final properties of the polyolefin, such as described in "Polypropylene Handbook," at pages 76-78 (Hanser Publishers, 1996). Using certain catalyst systems, increasing concentrations (partial pressures) of hydrogen can increase the melt index (MI) of the polyolefin generated. The MI can thus be influenced by the hydrogen concentration. The amount of hydrogen in the polymerization reactor can be expressed as a mole ratio relative to the total polymerizable monomer, for example, ethylene, or a blend of ethylene and hexene or propylene. The amount of hydrogen used in the polymerization process can be an amount necessary to achieve the desired MI of the final polyolefin resin. The mole ratio of hydrogen to total monomer ($H_2$:monomer) can be in a range from greater than 0.0001, or from greater than 0.0005, or from greater than 0.001, and less than 10, or less than 5, or less than 3, or less than 0.10, where a desirable range can include any combination of any upper mole ratio limit with any lower mole ratio limit described herein. Expressed another way, the amount of hydrogen in the reactor at any time can range to up to 20,000 ppm, or up to 5,000 ppm, or up to 4,000 ppm, or up to 3,000 ppm in, or between 50 ppm and 5,000 ppm, or between 500 ppm and 2,000 ppm. The ratio of hydrogen to total monomer ($H_2$:monomer) can be about 0.00001:1 to about 2:1, or about 0.005:1 to about 1.5:1, or about 0.0001:1 to about 1:1.

The reactor temperature can range from about 30° C., about 40° C., or about 50° C. to about 90° C., about 100° C., about 110° C., about 120° C., or about 150° C. In general, the reactor temperature can be operated at the highest feasible temperature taking into account the sintering temperature of the polymer product within the reactor. Regardless of the process used to make the polyolefins the polymerization temperature or reaction temperature should be below the melting or "sintering" temperature of the polyolefins to be formed. Thus, the upper temperature limit in one example can be the melting temperature of the polyolefin produced in the reactor.

The pressure within the gas phase polymerization reactor (either single stage or two or more stages) can vary from about 700 kPa to about 3,500 kPa, and in the range of from about 1,350 kPa to about 3,000 kPa in another example, and in the range of from about 1,600 kPa to about 2,000 kPa in yet another example.

The gas phase reactor can be capable of producing from about 10 kg of polymer per hour to about 90,000 kg/hr, and greater than about 450 kg/hr in another example, and greater than about 4,500 kg/hr in yet another example, and greater than about 10,000 kg/hr in yet another example, and greater than about 15,000 kg/hr in yet another example, and greater than about 30,000 kg/hr in yet another example, and from about 30,000 kg/hr to about 75,000 kg/hr in yet another example. Additional reactor details and means for operating the reactor can be as discussed and described in, for example, U.S. Pat. Nos. 3,709,853; 4,003,712; 4,011,382; 4,302,566; 4,543,399; 4,882,400; 5,352,749; and 5,541,270; European Patent No. EP 0802202; and Belgian Patent. No. 839,380.

Introducing the catalyst slurry and the continuity additive to the gas phase fluidized bed reactor can produce one or more polyolefin products without forming or generating agglomerates in the form of rubble, chunks, lumps, sheets, and/or the like. In other words, polymerization can be carried out without causing the formation of a detectable level of agglomerates such as rubble, chunks, lumps, sheets, and/or the like.

The polymerization reactor can be operated on a continuous or semi-continuous basis, i.e. without shutdown, for a time period ranging from a few hours to several days or weeks. For example, the polymerization reactor to which the catalyst slurry is continuously or semi-continuously introduced can be operated for about a day, about 2 days, about 3 days, about 5 days, about 7 days, about 10 days, about 15 days, or more with no detectable formation of agglomerates therein. In another example, the catalyst slurry and the continuity additive can be introduced to the polymerization reactor in a continuous or semi-continuous manner for a period of at least 3 days without the formation or generation of agglomerates in the form of rubble, chunks, lumps, sheets, and/or the like.

The polyethylene can have an $I_{21}/I_2$ ratio ($I_{21}$ is measured by ASTM-D-1238-F, (190° C./21.6 kg); $I_2$ is measured by ASTM-D-1238-E, (190° C./2.16 kg) ranging from a low of about 0.5, about 1, or about 5 to a high of about 30, about 100, or about 250. For example, the polyethylene can have an $I_{21}/I_2$ ratio of from about 0.5 to about 10, from about 0.8 to about 5, or from about 0.9 to about 2.5. In another example, the polyethylene can have a $I_{21}/I_2$ ratio of from about 10 to about 50, from about 20 to about 40, or from about 30 to about 45.

Density can be determined in accordance with ASTM D-792. The polyethylene can have a density ranging from a low of about 0.89 g/cm$^3$, about 0.90 g/cm$^3$, or about 0.91 g/cm$^3$ to a high of about 0.95 g/cm$^3$, about 0.96 g/cm$^3$, or about 0.97 g/cm$^3$. The polyethylene can have a bulk density, measured in accordance with ASTM-D-1238, of from about 0.25 g/cm$^3$ to about 0.5 g/cm$^3$. For example, the bulk density of the polyethylene can range from a low of about 0.30 g/cm$^3$, about 0.32 g/cm$^3$, or about 0.33 g/cm$^3$ to a high of about 0.40 g/cm$^3$, about 0.44 g/cm$^3$, or about 0.48 g/cm$^3$.

The polyethylene can be suitable for such articles as films, fibers, and nonwoven fabrics, extruded articles and molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

EXAMPLES

The following examples are put forth so as to provide those skilled in the art with a complete disclosure and description of how to make and use the compounds of the invention, and are not intended to limit the scope of that which the inventors regard as their invention. All parts, proportions, and percentages are by weight unless otherwise indicated. All examples were carried out in dry oxygen-free environments and solvents unless otherwise indicated.

Preparation of Spray-Dried MAO (SDMAO)

A toluene solution of methylaluminoxane (MAO) was prepared by adding 718 pounds of dry, degassed toluene, 493 pounds of 10 wt % MAO in toluene (MAO was from Albemarle Corporation, Baton Rouge, La.), and 67 pounds of fumed silica (Cabosil TS-610 available from Cabot Corporation, Boston, Mass.) to a 270 gallon feed tank. The mixture was stirred overnight at approximately 38° C. The mixture was then introduced to an atomizing device producing droplets that were contacted with a gas stream to evaporate the liquid, thereby forming a powder. The mixture was fed at a feed rate of 165 pounds per hour. The atomizer speed was maintained at 90%. The outlet temperature at the condenser was maintained at about 90° C. The spray-dried particles had an aluminum loading of 6 to 7 mmol Al/g. The spray-dried particles had a D50 of 20 microns, a D10 of 12 microns, and a D90 of 31.8 microns.

Preparation of Supported MAO (SMAO)

A slurry of silica and toluene was prepared by mixing 2618 g of dried degassed toluene and 770 g of dehydrated Davison 955 silica. This slurry was stirred at ambient temperature while 1124 g of 30 wt MAO (MAO was from Albemarle Corporation, Baton Rouge, La.) was added. The resulting slurry was stirred at ambient temperature for 30 minutes, and the solvent was then removed under reduced pressure with a stream of nitrogen at 95° C. jacket temperature. The drying was continued until the internal material temperature was constant for 2 hours. The resulting free-flowing white powder had an aluminum loading of 5 mmol Al per gram of solid.

Catalyst Precursors

The following catalyst precursors (catalyst components) were used in the preparation of the catalyst systems for the following examples:

Catalyst Precursor A

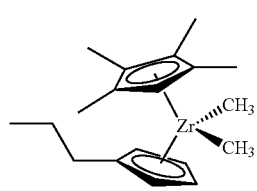

Catalyst Precursor B

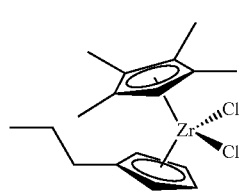

Catalyst Precursor C

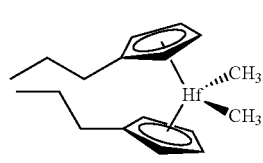

Catalyst Precursor D

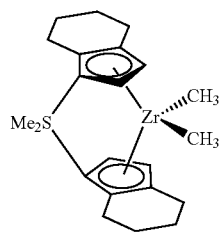

Catalyst Precursor E

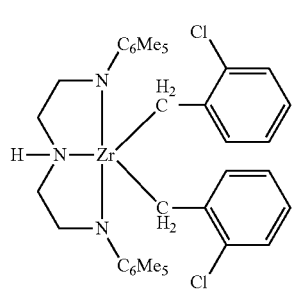

Catalyst Precursor F

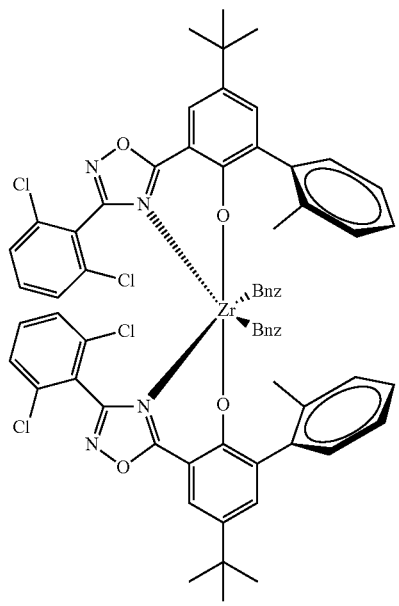

Catalyst Precursor G

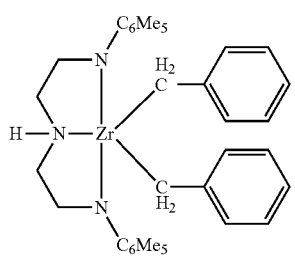

Catalyst Precursor H

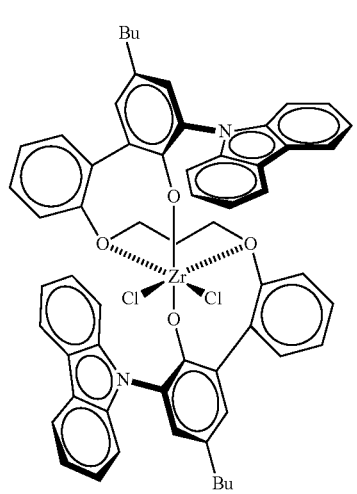

Catalyst Precursor I

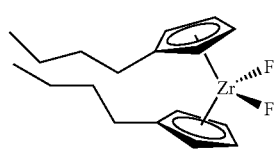

Catalyst Precursor J

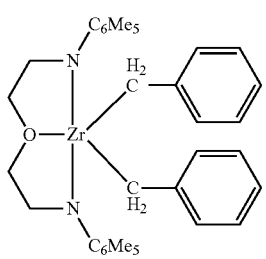

General Procedure for Preparation of the Catalyst Systems

Method A: The sample catalyst systems for Samples 1-10, 12-27, and 29-30 in Examples 1-3 was prepared using a "simple dip" procedure in accordance with the following general procedure. Inside a dry box, the catalyst component or components were first mixed with Kaydol oil (available from Witco Corporation, Memphis, Tenn.). Due to their low solubility, most non-metallocene catalysts existed as a suspension in the Kaydol oil. The above-mentioned SDMAO or SMAO was then added and the resulting mixture was rolled at room temperature overnight before being used in the polymerization. In most cases, this mixing time was sufficient to produce a full activated catalyst for the polymerization. Typical Al/TM (transition metal) ratios used for the catalyst ranged from 50-150 and solid catalyst components in the Kaydol oil were around 5-15%.

Method B: The sample catalyst system for comparative Sample 11 in Example 1 was prepared using a conventional support technique. An example of a general procedure for preparing a catalyst system using a conventional support technique follows. Dehydrated silica gel (Ineos 757 silica) is added to a solution of metallocene and 10 wt % methylaluminoxane (MAO from Albemarle Corporation, Baton Rouge, La.). This slurry is stirred at ambient temperature for 30 minutes to 1 hour and the solvent is then removed under reduced pressure with a stream of nitrogen at 75° C. jacket temperature. The drying is continued until the internal material temperature is constant for 2 hours. The final catalyst is free-flowing solid with white to off-white color.

Method C: The sample catalyst system for comparative Samples 30 and 33 in Example 3 was prepared using a conventional spray-drying technique. An example of a general procedure for preparing a catalyst system using a conventional spray-drying technique follows. A slurry of methylaluminoxane (MAO) and filler (e.g. fumed silica) is prepared by adding toluene, MAO, and filler to the feed tank. This mixture is stirred, followed by addition of the catalyst component. The slurry is then introduced to an atomizing device producing droplets that were contacted with a gas stream to evaporate the liquid, thereby forming a powder.

General Procedure for Gas-Phase Polymerization

Polymerizations were performed in a lab-scale gas phase fluidized bed reactor. For maximum mixing, the reactor is normally operated at a 45 degree angle from its vertical position during polymerization. The reactor was first charged with 400 g of NaCl and dried by heating at 95° C. under a stream of dry nitrogen for an hour. The reactor temperature was then lowered to 60° C. and 5 g of SMAO (used as an impurity scavenger) was introduced under a stream of dry nitrogen. After the addition of the SMAO, the reactor was sealed and the components were gently stirred. The reactor was the charged with the specified amount of hydrogen (about 3,000 ppm) and 1-hexene (C6/C2, about 0.004). The reactor was then pressurized with 220 psi of ethylene. Once the system reaches a steady state, the catalyst system was charged into the reactor using a stainless steel bomb to start polymerization. The reactor was then brought up to the specified temperature and maintained at this temperature throughout the polymerization. Unless otherwise noted, the polymerization was carried out for 60 minutes, during which time ethylene was slowly added to the reactor to maintain a constant pressure. At the end of 60 minutes, the reactor was cooled down, vented, and opened. The resulting mixture was washed with water, methanol, and dried.

Example 1

Gas-phase polymerization procedures were carried out in the above-described gas phase fluidized bed reactor to evaluate the use of metallocenes supported on spray dried MAO. As noted in Table 1 below, in each of Samples 1 through 4, Catalyst Precursor A was used with a support; in each of Samples 5-8, Catalyst Precursor B was used with a support; in each of Samples 9-11, Catalyst Precursor C used with a support; and in each of Samples 12-13, Catalyst Precursor D was used with a supported.

Table 1 summarizes the polymerization results.

TABLE 1

| | Catalyst Information | | | | Polymerization Conditions | | | | |
| | | | | | C2 | C6/C2 | | | |
| Sample | Catalyst Precursor | Support/ Activator | Cat. Prep. Method | Zr Loading (mmol/g) | Partial Pressure (psi) | Conc. Ratio (m/m) | H2 Conc. (ppm) | Reaction Temp. (° C.) | Catalyst Productivity (gPE/g) |
|---|---|---|---|---|---|---|---|---|---|
| 1 | A | SDMAO | A | 0.040 | 220 | 0.007 | 3,000 | 85 | 9,120 |
| 2 (Comp) | | SMAO | A | 0.038 | 220 | 0.007 | 3,000 | 85 | 4,593 |
| 3 | | SDMAO | A | 0.050 | 220 | 0.004 | 3,000 | 100 | 9,286 |
| 4 (Comp) | | SMAO | A | 0.040 | 220 | 0.004 | 3,000 | 100 | 3,150 |
| 5 | B | SDMAO | A | 0.050 | 220 | 0.007 | 3,000 | 85 | 8,737 |
| 6 (Comp) | | SMAO | A | 0.043 | 220 | 0.007 | 3,000 | 85 | 3,787 |
| 7 | | SDMAO | A | 0.047 | 220 | 0.004 | 3,000 | 100 | 7,094 |
| 8 (Comp) | | SMAO | A | 0.038 | 220 | 0.004 | 3,000 | 100 | 3,892 |
| 9 | C | SDMAO | A | 0.054 | 220 | 0.004 | 3,000 | 100 | 11,532 |
| 10 (Comp) | | SMAO | A | 0.056 | 220 | 0.004 | 3,000 | 100 | 5,900 |
| 11 (Comp) | | Ineos 757 | B | 0.045 | 220 | 0.004 | 3,000 | 100 | 2,884 |

TABLE 1-continued

|  | Catalyst Information | | | | Polymerization Conditions | | | | |
|---|---|---|---|---|---|---|---|---|---|
|  |  |  | Cat. Prep. Method | Zr Loading (mmol/g) | C2 Partial Pressure (psi) | C6/C2 Conc. Ratio (m/m) | H2 Conc. (ppm) | Reaction Temp. (° C.) | Catalyst Productivity (gPE/g) |
| Sample | Catalyst Precursor | Support/ Activator | | | | | | | |
| 12 | D | SDMAO | A | 0.05 | 220 | 0.004 | 3,000 | 100 | 8,162 |
| 13 (Comp) |  | SMAO | A | 0.05 | 220 | 0.004 | 3,000 | 100 | 5,160 |

As illustrated by Table 1, the catalyst productivity for the SDMAO-based systems exhibited greater catalyst productivity as compared to the SMAO-based systems or the catalyst with a conventional support technique. In particular, the use of SDMAO as the support/activator boosted the productivity of the unbridged metallocenes (Catalyst Precursors A, B, and C) listed above by around 100% or more over that of the SMAO-based systems. For example, Sample 1 had a catalyst productivity of 9,120 gPE/g, while Sample 2 (Comparative) had a catalyst productivity of 4,593 gPE/g, which was about 98% more for the SDMAO-based system of Sample 1. However, the boost for bridged metallocenes (Catalyst Precursor D) was shown to be somewhat less, but still significant. For example, Sample 12 had a catalyst productivity of 8,162 gPE/g, while Sample 13 (Comparative) had a catalyst productivity of 5,160 gPE/g, which was about 58% more for the SDMAO-based system of Sample 12.

Example 2

Additional gas-phase polymerization procedures were carried out in the above-described gas phase fluidized bed reactor to further evaluate the use of catalyst supported on SDMAO. In this example, SDMAO was applied to non-metallocene catalyst precursor systems either used as single component and/or as a component in mixed metal systems. As noted in Table 2 below, in each of Samples 14-15, Catalyst Precursor E was used with a support; in each of Samples 16-19, Catalyst Precursor F was used with a support; in each of Samples 20-23, a mixed metal catalyst of Catalyst Precursor F and Catalyst Precursor G was used with a support; and in each of Samples 24-27, a mixed metal catalyst of Catalyst Precursor H and Catalyst Precursor I was used with a support. Table 2 summarizes the polymerization results.

TABLE 2

|  | Catalyst Information | | | | Polymerization Conditions | | | | |
|---|---|---|---|---|---|---|---|---|---|
|  |  |  | Cat. Prep. Method | Solid Loading (mmol/g) | C2 Partial Pressure (psi) | C6/C2 Conc. Ratio (m/m) | H2 Conc. (ppm) | Reaction Temp. (° C.) | Catalyst Productivity (gPE/g) |
| Sample | Catalyst Precursor | Support/ Activator | | | | | | | |
| 14 (Comp) | E | SMAO | A | 0.033 | 220 | 0.005 | 3000 | 85 | 1,328 |
| 15 |  | SDMAO | A | 0.037 | 220 | 0.005 | 3000 | 85 | 2,519 |
| 16 (Comp) | F | SMAO | A | 0.040 | 220 | 0.004 | 3000 | 85 | 2,454 |
| 17 |  | SDMAO | A | 0.040 | 220 | 0.004 | 3000 | 85 | 6,909 |
| 18 (Comp) |  | SMAO | A | 0.040 | 220 | 0.004 | 3000 | 100 | 2,915 |
| 19 |  | SDMAO | A | 0.040 | 220 | 0.004 | 3000 | 100 | 8,435 |
| 20 (Comp) | F/G | SMAO | A | 0.048 | 220 | 0.004 | 3000 | 85 | 2,202 |
| 21 |  | SDMAO | A | 0.048 | 220 | 0.004 | 3000 | 85 | 5,545 |
| 22 (Comp) |  | SMAO | A | 0.048 | 220 | 0.004 | 3000 | 100 | 1,994 |
| 23 |  | SDMAO | A | 0.048 | 220 | 0.004 | 3000 | 100 | 5,044 |
| 24 (Comp) | H/I | SMAO | A | 0.041 | 220 | 0.0025 | 3000 | 85 | 3,838 |
| 25 |  | SDMAO | A | 0.041 | 220 | 0.0025 | 3000 | 85 | 7,961 |
| 26 (Comp) |  | SMAO | A | 0.041 | 220 | 0.0025 | 3000 | 100 | 5,555 |
| 27 |  | SDMAO | A | 0.041 | 220 | 0.0025 | 3000 | 100 | 10,616 |

As illustrated by Table 2, the catalyst productivity for the SDMAO-based systems exhibited greater catalyst productivity as compared to the SMAO-based systems. This productivity boost was seen for non-metallocene systems whether used as a single component (e.g., compare Samples 14 and 15) or a component in mixed metal system (e.g., compare Samples 20 and 21). It should be noted that, while phenoloxadiazoles compounds, such as Catalyst Precursor F, showed a productivity boost with SDMAO (e.g., compare Samples 16 and Sample 17), in three cases not shown, phenoloxadiazoles with different substitution patterns exhibited little to no productivity increase when supported on SDMAO versus SMAO.

Example 3

Additional gas-phase polymerization procedures were carried out in the above-described gas phase fluidized bed reactor to further evaluate the use of catalyst supported on SDMAO. As described in Table 3 below, in each of Samples 28-30, Catalyst Precursor G was used with a support and in each of Samples 31-34, Catalyst Precursor J was used with a support.

Table 3 summarizes the polymerization results.

TABLE 3

| | Catalyst Information | | | | Polymerization Conditions | | | | |
|---|---|---|---|---|---|---|---|---|---|
| Sample | Catalyst Precursor | Support/ Activator | Cat. Prep. Method | Solid Loading (mmol/g) | C2 Partial Pressure (psi) | C6/C2 Conc. Ratio (m/m) | H2 Conc. (ppm) | Reaction Temp. (° C.) | Catalyst Productivity (gPE/g) |
| 28 | G | SDMAO | A | 0.050 | 220 | 0.005 | 3000 | 85 | 2,474 |
| 29 (Comp) | | SMAO | A | 0.037 | 220 | 0.004 | 3000 | 100 | 1,650 |
| 30 (Comp) | | — | C | 0.040 | 220 | 0.004 | 3000 | 100 | 4,949 |
| 31 | J | SDMAO | A | 0.043 | 220 | 0.004 | 3000 | 100 | 1,474 |
| 32 (Comp) | | SMAO | A | 0.040 | 220 | 0.004 | 3000 | 100 | 1,653 |
| 33 (Comp) | | — | C | 0.043 | 220 | 0.004 | 3000 | 100 | 7,032 |

As seen in Table 3, the productivity boosts for the SDMAO-based systems of Catalyst Precursor G and Catalyst Precursor J differed from those of Examples 1 and 2. The SDMAO-based system of Catalyst Precursor G in Sample 28 showed a productivity boost of about 50% when compared to the SMAO-based system in Sample 29 (Comparative). However, the SDMAO-based system of Catalyst Precursor J in Sample 31 did not show improved productivity when compared to the SMAO-based system in Sample 32 (Comparative). Even further, the productivities of the SDMAO-based systems of Catalyst Precursor G and Catalyst Precursor J were lower than the same catalyst system prepared by spray drying. Without being limited by theory, it is believed that reduced productivity enhancement for SDMAO may occur for catalysts that have low solubility in the hydrocarbon solvent in which the catalyst system is prepared.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

In the preceding description and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

What is claimed is:

1. A method of preparing a catalyst system comprising:
forming a spray-dried activator;
combining the spray-dried activator and one or more catalyst components with a diluent to produce a slurry for the catalyst system, where the diluent is a mixture of mineral oil and an aliphatic hydrocarbon.

2. The method of claim 1, further comprising:
combining an activator, a filler material, and a diluent; and
spray drying the suspension to produce the spray-dried activator.

3. The method of claim 1, wherein the spray-dried activator comprises at least one activator selected from the group consisting of a Lewis acid activator, a non-coordinating ionic activator, an ionizing activator, an organoaluminum compound, an aluminoxane, a modified aluminoxane, and any combination thereof.

4. The method of claim 1, wherein the spray-dried activator comprises at least one activator selected from the group consisting of methylaluminoxane, modified methylaluminoxane, and combinations thereof.

5. The method of claim 1, wherein the spray-dried activator comprises an aluminoxane, the aluminoxane being present in the catalyst system in an amount of about 10 mmol or less per gram of the catalyst system.

6. The method of claim 1, wherein the spray-dried activator has an average particle size ranging from about 1 micron to about 500 microns.

7. The method of claim 1, wherein the catalyst system further comprises a filler material and the filler material comprises fumed silica having an average particle size of less than about 150 microns.

8. The method of claim 1, wherein the catalyst system comprises at least one catalyst selected from the group consisting of a metallocene catalyst, a transition metal-containing catalyst, a Group 15-containing catalyst, a catalyst comprising an oxadiazole compound, a biphenyl phenol catalyst, a mixed catalyst, and any combination thereof.

9. The method of claim 1, wherein the catalyst system comprises a metallocene catalyst represented by the following structure:

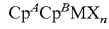

wherein
M is selected from a Group 3 atom, a Group 4 atom, a Group 5 atom, a Group 6 atom, a Group 7 atom, a Group 8 atom, a Group 9 atom, a Group 10 atom, a Group 11 atom, a Group 12 atom, and a lanthanide Group atom;

$Cp^A$ and $Cp^B$ are each individually selected from cycloalkadienyl ligand, a substituted cyclopentadienyl ligand, a ligand isolobal to cyclopentadienyl, and a substituted isolobal to cyclopentadienyl, wherein $Cp^A$ and $Cp^B$ are each chemically bonded to M;

X is a leaving group, wherein X is chemically bonded to M; and n is 0 or an integer from 1 to 4.

10. The method of claim 1, wherein the catalyst system comprises a metallocene catalyst represented by the following structure:

wherein

M is selected from a Group 3 atom, a Group 4 atom, a Group 5 atom, a Group 6 atom, a Group 7 atom, a Group 8 atom, a Group 9 atom, a Group 10 atom, a Group 11 atom, a Group 12 atom, and a lanthanide Group atom;

$Cp^A$ and $Cp^B$ are each individually selected from a cycloalkadienyl, ligand, a substituted cyclopentadienyl ligand, a ligand isolobal to cyclopentadienyl, and a substituted isolobal to cyclopentadienyl;

A is a divalent bridging group bound to both $Cp^A$ and $Cp^B$;

X is a leaving group; and n is 0 or an integer from 1 to 4.

11. The method of claim 1, wherein the catalyst system comprises an oxadiazole compound represented by the following structure (I):

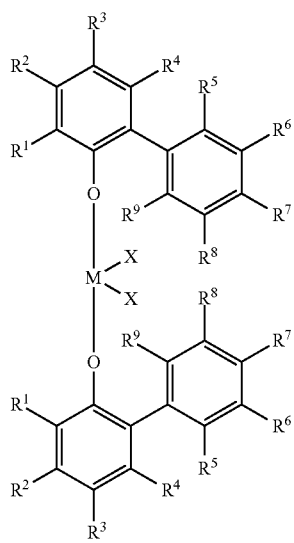

wherein:

M is selected from the group consisting of Ti, Zr, and Hf;

at least one group selected from $R^1$ through $R^9$ is substituted with a moiety having the following structure (II):

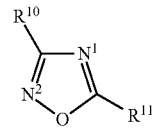

where the structure is attached at any one of $R^1$ through $R^9$ at the $R^{10}$ or $R^{11}$ position;

at least one nitrogen selected from $N^1$ and $N^2$ of the structure (II) forms a dative bond with M;

each of $R^1$ through $R^{11}$ are independently selected from hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, aiylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is a leaving group.

12. The method of claim 1, wherein the catalyst system comprises a Group-15 containing catalyst, wherein the Group-15 containing catalyst comprises a metal complex comprising a Group 3 to Group 12 metal that is 2 to 6 coordinate with a coordinating moiety comprising at least two Group 15 atoms.

13. The method of claim 1, wherein the catalyst system comprises a biphenyl phenol catalyst represented by the following structure:

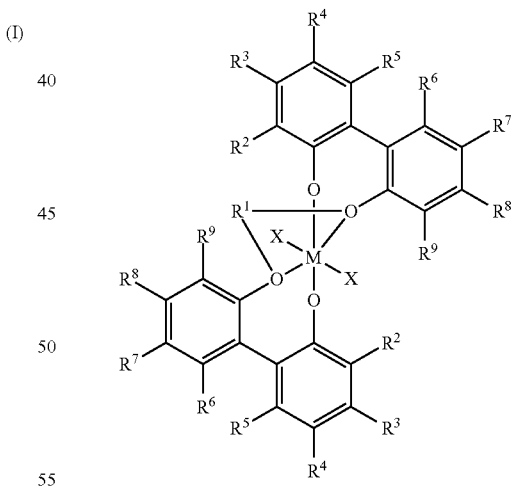

wherein:

M is selected from the group consisting of Ti, Zr, and Hf;

$R^1$ is selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine;

each of $R^2$ through $R^9$ are independently selected from hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is a leaving group.

\* \* \* \* \*